US012645078B1

(12) United States Patent
Landig et al.

(10) Patent No.: US 12,645,078 B1
(45) Date of Patent: Jun. 2, 2026

(54) SCANNING DISPLAY DEVICE WITH A SWITCHABLE GRATING

(71) Applicant: Meta Platforms Technologies, LLC, Menlo Park, CA (US)

(72) Inventors: Renate Eva Klementine Landig, Kirkland, WA (US); Daniel Guenther Greif, Kirkland, WA (US); Sihui He, Sunnyvale, CA (US); Babak Amirsolaimani, Redmond, WA (US); Jacques Gollier, Sammamish, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 452 days.

(21) Appl. No.: 18/133,455

(22) Filed: Apr. 11, 2023

Related U.S. Application Data

(60) Provisional application No. 63/415,265, filed on Oct. 11, 2022.

(51) Int. Cl.
*G02B 27/00* (2006.01)
*F21V 8/00* (2006.01)
*G02B 27/01* (2006.01)

(52) U.S. Cl.
CPC ....... *G02B 27/0172* (2013.01); *G02B 6/0016* (2013.01); *G02B 27/0081* (2013.01); *G02B 2027/0178* (2013.01)

(58) Field of Classification Search
CPC ........ G02B 27/00; G02B 27/01; G02B 27/10; G02B 27/0172; G02B 6/0016; G02B 27/0081; G02B 2027/0178
USPC .......................................................... 359/629
See application file for complete search history.

(56) References Cited

U.S. PATENT DOCUMENTS

| | | | | |
|---|---|---|---|---|
| 2009/0091718 | A1* | 4/2009 | Obi ...................... | H04N 9/3182 355/70 |
| 2021/0109343 | A1* | 4/2021 | Gao ................... | G02B 26/0833 |
| 2021/0191122 | A1* | 6/2021 | Yaroshchuk ......... | G02B 6/0076 |
| 2023/0375787 | A1* | 11/2023 | Montfort ............ | G02B 27/4261 |

* cited by examiner

*Primary Examiner* — Henry Duong
(74) *Attorney, Agent, or Firm* — Greenberg Traurig, LLP

(57) ABSTRACT

A display device includes a scanning projector coupled to a lightguide having at least one of in-coupling or out-coupling gratings switchable. The switchable in-coupling grating lessens optical losses related to beam walkoff and out-coupling by the in-coupling grating, and/or the switchable out-coupling grating improves light utilization by only sending the image light to the area where user's eye is located. The out-coupling grating switching may be coordinated with the scanning of an image light beam by the scanning projector to account for a finite turn-on and turn-off time of the switchable grating to reduce undesired image distortions and other deleterious effects.

20 Claims, 14 Drawing Sheets

Plan view 201

251

225 — — 204

200

252

Plan view 202B

261

265

262

124

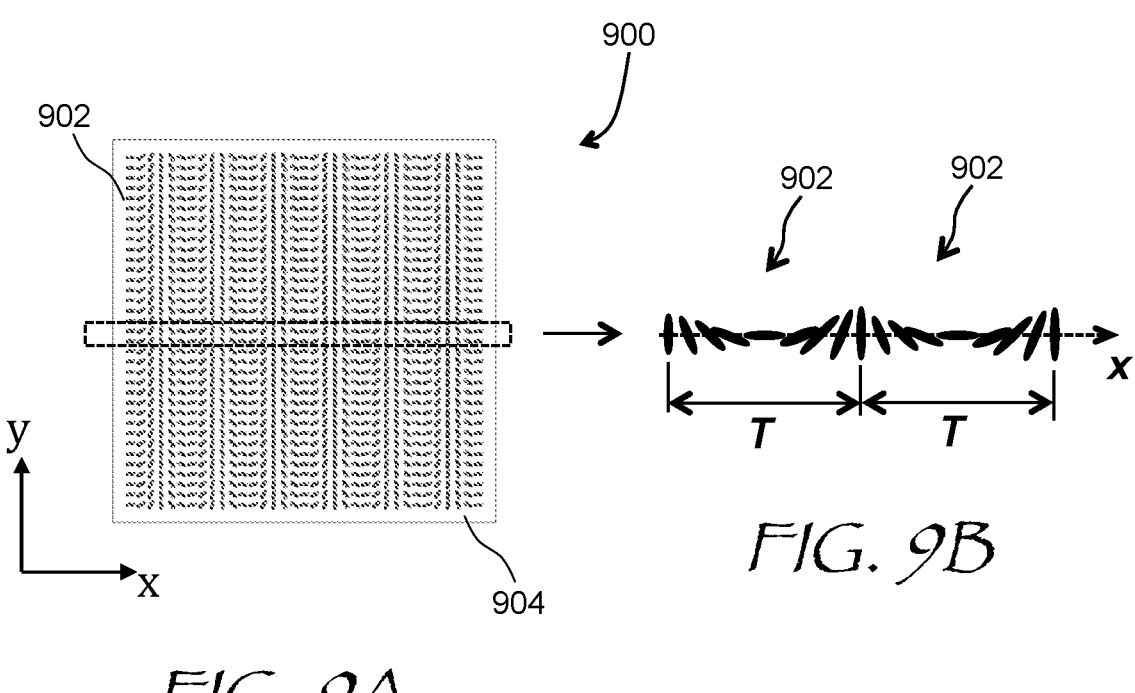
900
902
902            902
y
x
904
*FIG. 9A*
T            T
x
*FIG. 9B*
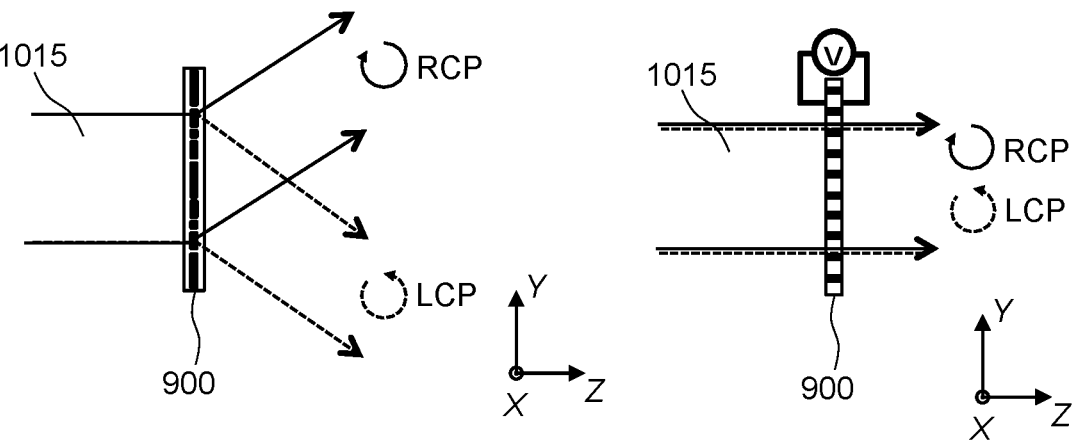
1015
RCP
LCP
900
Y
X            Z
*FIG. 10A*
1015
V
RCP
LCP
900
Y
X            Z
*FIG. 10B*

SCANNING DISPLAY DEVICE WITH A SWITCHABLE GRATING

REFERENCE TO RELATED APPLICATION

The present application claims priority from U.S. Provisional Patent Application No. 63/415,265, entitled "Scanning Display Device With Switchable Gratings", filed on Oct. 11, 2022, and incorporated herein by reference in its entirety.

TECHNICAL FIELD

The present disclosure relates to visual displays, and in particular to visual display devices and components therefor.

BACKGROUND

Visual displays provide information to viewer(s) including still images, video, data, etc. Visual displays have applications in diverse fields including entertainment, education, engineering, science, professional training, advertising, to name just a few examples. Some visual displays, such as TV sets, display images to several users, and some visual display systems, such s near-eye displays or NEDs, are intended for individual users.

An artificial reality system generally includes an NED, for example a headset or a pair of glasses, configured to present content to a user. The NED may display virtual objects or combine images of real objects with virtual objects, as in virtual reality (VR), augmented reality (AR), or mixed reality (MR) applications. For example, in an AR system, a user may view both images of virtual objects (e.g., computer-generated images) and the surrounding environment by seeing through a "combiner" component. The combiner of a wearable display is typically transparent to external light but includes some light routing optics, such as gratings, to direct the display light into the user's field of view.

Because a display of HMD or NED is usually worn on the head of a user, a large, bulky, unbalanced, and/or heavy display device with a heavy battery would be cumbersome and uncomfortable for the user to wear. Head-mounted display devices require compact and efficient optical train that conveys an image generated by a microdisplay or a beam scanner to eyes of a user with minimal losses and distortions.

BRIEF DESCRIPTION OF THE DRAWINGS

Exemplary embodiments will now be described in conjunction with the drawings, in which:

FIG. 9A is a frontal view of an active Pancharatnam-Berry phase (PBP) liquid crystal (LC) grating usable in a lightguide of this disclosure;

FIG. 9B is a magnified schematic view of LC molecules in an LC layer of the active PBP LC grating of FIG. 9A;

FIGS. 10A and 10B are side schematic views of the active PBP LC grating of FIGS. 9A and 9B, showing light propagation in OFF (FIG. 10A) and ON (FIG. 10B) states of the active PBP LC grating;

DETAILED DESCRIPTION

Figure 1:
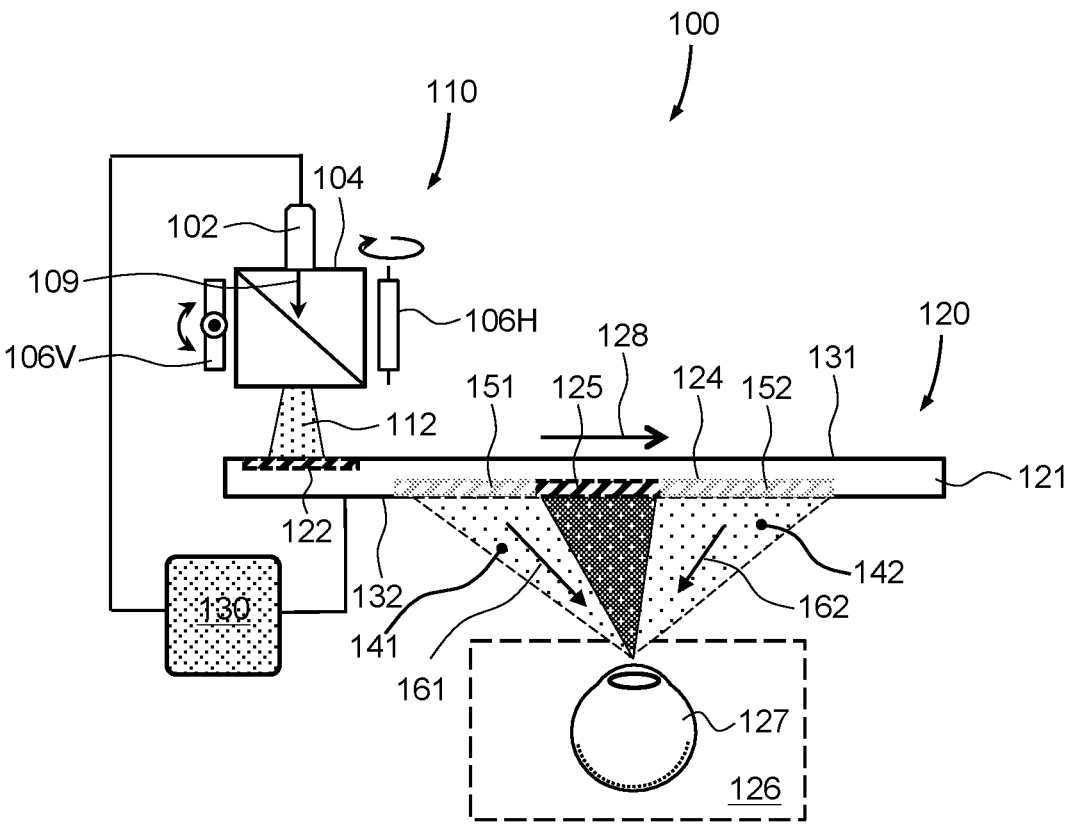
FIG. 1 is a schematic side view of a display device of this disclosure with an out-coupling grating having a spatially selective tunable out-coupling efficiency.

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated. In FIGS. 1, 3, 5, FIGS. 6A-6B, and FIGS. 7A-7C, similar reference numerals denote similar elements.

Near-eye displays and augmented reality displays may use pupil-replicating lightguides to expand image light carrying a projected image over an eyebox of the display, i.e., over an area where a user's eye may be located during normal operation of the display. A pupil-replicating lightguide may include a plano-parallel slab of a transparent material configured to propagate the image light in a zigzag pattern by total internal reflection (TIR) from the lightguide's opposed surfaces.

One drawback of pupil-replicating lightguides is that the spreading the image light over an extended area causes a considerable portion of the image light coupled into the pupil-replicating lightguide to never reach the eye pupil, illuminating instead the user's eyes and face. This reduces the overall light utilization efficiency of the display. A poor light utilization efficiency may be compensated by using a brighter light source; however, this requires a larger and heavier battery, which increases the size and weight of the display, making it uncomfortable for the user to wear it for long periods of time. Furthermore, when the lightguide is a part of an augmented reality system, the image light from an image source internal to the augmented reality system has to compete in brightness with outside light visible by the display user. The augmented image brightness may need to be increased by several orders of magnitude for the generated imagery to be visible in broad daylight. It is therefore highly desirable to improve the light utilization efficiency in displays using pupil-replicating lightguides.

In accordance with this disclosure, a lightguide of a display device may include an out-coupling grating having an in-coupling efficiency and/or out-coupling efficiency tunable in a spatially-selective, time-variant manner, enabling one to reduce image light losses and match the distribution of the image light portions at the eyebox to the eye pupil position and orientation. The image light distribution may be optimized to account for the eye position and orientation, as well as to account for a currently displayed portion of the field of view (FOV). The goal is to not send the light energy to eyebox locations where the eye pupil is not present, and/or to not send the image light energy into FOV portions currently not displayed or otherwise non-visible by the user of the display, thereby saving light energy. Furthermore, a spatially variant switchable in-coupling grating enables the image light to be in-coupled into the lightguide more efficiently, improving the overall light utilization and wall plug efficiency of the display device.

In accordance with the present disclosure, there is provided a display device comprising a scanning projector for providing a light beam, and a lightguide operably coupled to the scanning projector for conveying portions of the light beam to an eyebox of the display device. The lightguide includes a switchable in-coupling grating for in-coupling the light beam into the lightguide by redirecting the light beam in a first direction to propagate in the lightguide by a series of internal reflections.

The switchable in-coupling grating may include a nonswitchable grating segment and a first switchable grating segment conterminous with the non-switchable grating segment and offset relative to the non-switchable grating segment in the first direction. The switchable in-coupling grating may further include a second switchable grating segment conterminous with the first switchable grating segment and offset relative to the first switchable grating segment in the first direction. The switchable in-coupling grating may include a plurality of conterminous switchable grating segments offset relative to one another in the first direction. The switchable in-coupling grating may have a switchable spatially variant diffraction efficiency.

In embodiments where the switchable in-coupling grating has a switchable spatially variant diffraction efficiency, the scanning projector may scan the light beam across the switchable in-coupling grating in the first direction from a first location to a second location on the switchable in-coupling grating. When at the first location, the light beam propagates through the lightguide, reflects from its back surface, and impinges onto the switchable in-coupling grating from inside the lightguide at the second location. A diffraction efficiency of the switchable in-coupling grating at the second location is lessened to lessen a diffraction of the light beam at the second location while preserving the diffraction efficiency of the switchable in-coupling grating at the first location. When the light beam impinges from outside of the lightguide onto the switchable in-coupling grating at the second location, the diffraction efficiency of the switchable in-coupling grating at the second location of the switchable in-coupling grating is increased to increase the diffraction of the light beam at the second location.

In some embodiments, the scanning projector comprises a tiltable reflector and/or a rastered microdisplay panel. The switchable in-coupling grating may include a switchable surface-relief liquid crystal (LC) grating, an active Pancharatnam-Berry phase (PBP) LC grating, a polarization volume grating, and/or a fluidic surface-relief grating.

In accordance with the present disclosure, there is provided a display device comprising a scanning projector for providing a light beam, a lightguide operably coupled to the scanning projector for receiving and propagating the light beam in the lightguide, and a controller operably coupled to the scanning projector. The lightguide includes an outcoupling grating for out-coupling portions of the light beam propagating in the lightguide to an eyebox of the display device. The out-coupling grating is switchable between ON and OFF states. The controller is configured to have the out-coupling grating in the ON state during a first time interval, and perform a scan of the light beam from a first field of view (FOV) point to a second FOV point during the first time interval. The controller is further configured cause the scanning projector to not emit the light beam during a second, subsequent time interval, and switch the out-coupling grating to the OFF state during the second time interval.

The out-coupling grating may have a turn-on time interval from the OFF state to the ON state. The controller may be configured to turn the out-coupling grating ON at least the turn-on time interval before performing the scan of the light beam from the first to the second FOV points. The outcoupling grating may be switchable in a spatially selective manner for providing a configurable distribution of the light beam portions at the eyebox.

In embodiments where scan is a linear raster scan of a collimated light beam, the first time interval may be equal to the second time interval to within +/−10%. In embodiments where scan is a Lissajous scan of a collimated light beam, the second time interval may be equal to an integer multiple of the first time interval to within +/−10%. The in-coupling grating may include e.g. a switchable surface-relief LC grating, an active PBP LC grating, a polarization volume grating, and/or a fluidic surface-relief grating. The outcoupling grating may be configured for switching a grating efficiency, a grating pitch, a grating slant angle, and/or a grating blazing angle.

In accordance with the present disclosure, there is further provided a display device comprising a scanning projector for providing a light beam, and a lightguide comprising a switchable in-coupling grating operably coupled to the scanning projector for in-coupling the light beam into the lightguide by redirecting the light beam to propagate in the lightguide by a series of internal reflections, and a switchable out-coupling grating for out-coupling portions of the light beam propagating in the lightguide to an eyebox of the display device. At least one of the switchable in-coupling or out-coupling grating may be spatially variant.

Referring now to FIG. 1, a display device 100 includes an image projector 110 for providing image light 112 carrying an image in angular domain to be displayed to the viewer. Herein, the term "image in angular domain" means an image where each pixel is represented by a ray angle of image light, the color and/or brightness of a light beam at the ray angle representing the color and/or brightness of the corresponding pixel of the image being displayed. Such an image may be viewed by an eye directly, without an ocular lens or another angle-to-offset optical element in front of the eye. In the embodiment shown, the image projector 110 includes a light source 102 for providing a collimated light beam 109 with variable brightness and, optionally, color, a polarization beam splitter (PBS) 104 for folding the optical path by polarization, and a pair of tiltable reflectors 106H and 106V for horizontal and vertical scanning of the light beam respectively.

A lightguide 120, e.g. a pupil-replicating lightguide, is coupled to the image projector 110. The lightguide 120 may be implemented in a slab 121 of transparent material for conveying the image light 112 by a series of alternating zigzag reflections from top 131 and bottom 132 surfaces of the slab 121, e.g. total internal reflections (TIRs). An in-coupler 122, e.g. an in-coupling grating, may be provided for in-coupling the image light 112 into the slab 121.

The lightguide 120 further includes an out-coupling grating 124 configured to out-couple spaced apart portions of the image light towards an eyebox 126. An out-coupling efficiency of the out-coupling grating 124 is tunable in a spatially-selective manner for providing a configurable distribution of the image light portions at the eyebox 126. Herein and throughout the rest of the specification, the terms "switchable", "tunable", and "variable" may be used interchangeably. These terms mean that the grating strength, pitch (grating period), blazing or slant angle, etc., may be controlled by applying an external control signal. In the illustrated example, the grating efficiency spatial distribution includes a high-efficiency region 125 which moves or "runs" from left to right, as indicated by an arrow 128.

The display device 100 may further include a controller 130 operably coupled to the image projector 110 and the lightguide 120, specifically to the out-coupling grating 124 of the lightguide 120. The controller 130 may be configured to tune the spatial distribution of the out-coupling efficiency of the out-coupling grating 124 in coordination with operating the image projector 110, to optimize the out-coupling of the image light portions carrying currently displayed FOV portion to a user's eye 127. For example, the controller 130 may cause the image projector 110 to provide a first FOV portion 141, and increase the out-coupling efficiency of a first portion 151 of the out-coupling grating 124 to increase a first portion 161 of the image light 112, the first image light portion 161 corresponding to the first FOV portion 141. The controller 130 may cause the high-efficiency region 125 to shift or run along the out-coupling grating 124 in sync, or in coordination, with the FOV scanning by the image projector 110. By the time the image projector 110 provides a second, different FOV portion 142, the controller 130 increases the out-coupling efficiency of a second portion 152 of the out-coupling grating 124 to increase a second portion 162 of the image light 112 corresponding to the second FOV portion 142. This enables the out-coupling grating 124 to always be optimized for out-coupling the FOV portion that is currently being provided by the image projector 110, thereby improving the overall light utilization efficiency.

Figure 2A:
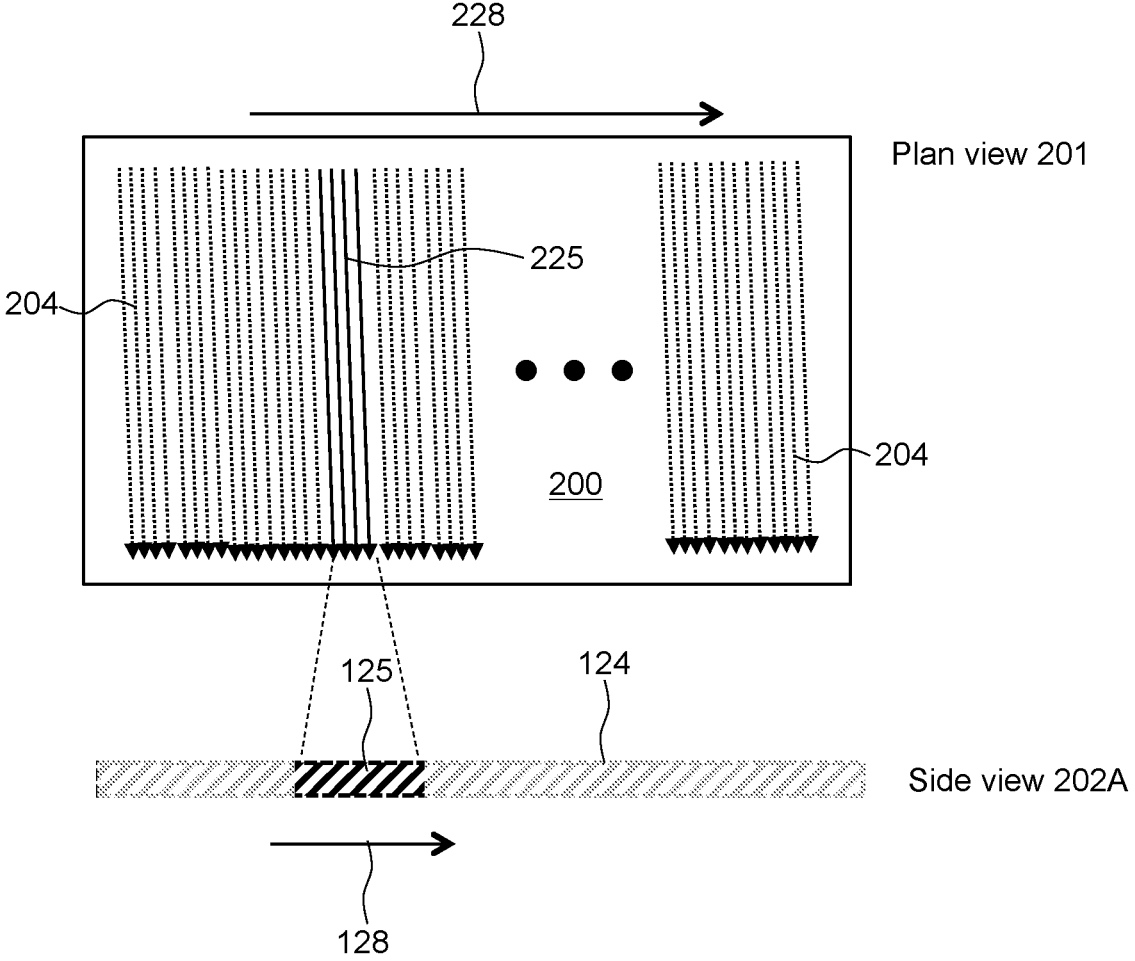
FIG. 2A is a plan view of a scanned field of view (FOV) with a high-efficiency portion of the out-coupling grating of FIG. 1 running in coordination with scanning lines.

FIG. 2A illustrates one embodiment of the scanning optimization concept of FIG. 1. A top portion of FIG. 2A is a plan view 201 of an FOV 200 being provided by the image projector 110. In this embodiment, the image projector 110 scans the entire FOV line-by-line, as represented by arrows 204, eventually covering the entire FOV 200. Such scanning may be provided, for example, by scanning the vertical tiltable reflector 106V quickly while scanning the horizontal tiltable reflector 106H slowly; the arrows 204 appear slightly tilted due to the simultaneous continuous scanning. The high-efficiency region 125 corresponds to one or several lines 225 of the FOV being currently scanned. The currently scanned lines are shown with solid arrows, whereas the scanned lines or the lines to be scanned are shown with dashed arrows.

A bottom portion of FIG. 2A is a side view 202A of the out-coupling grating 124. As the scanned lines 225 shift from left to right as indicated with an arrow 228 in the top (plan) view 201, the high-efficiency region 125 of the out-coupling grating 124 shifts from left to right to provide high out-coupling efficiency for the image light portions carrying or representing the currently provided FOV portions, i.e. the currently scanned line(s) 225. The shift of the high-efficiency region 125 is indicated with the arrow 128. In relation to the scanning described above with reference to FIG. 1, the first FOV portion 141 of FIG. 1 includes one or several lines 225 (FIG. 2A) of the image in angular domain, and the second FOV portion 142 includes a second, different line or set of lines of the image in angular domain. Several consecutive lines may form a section that is being tracked by the high-efficiency region 125. Herein, the terms "first line" and "second line" or "first section" and "second section" do not necessarily imply that the two lines or sections are conterminous, or are consecutively scanned. In other words, the two lines may be non-conterminous and/or may belong to different sections of lines, and two different sections may be non-conterminous/non-consecutive.

Figure 2B:
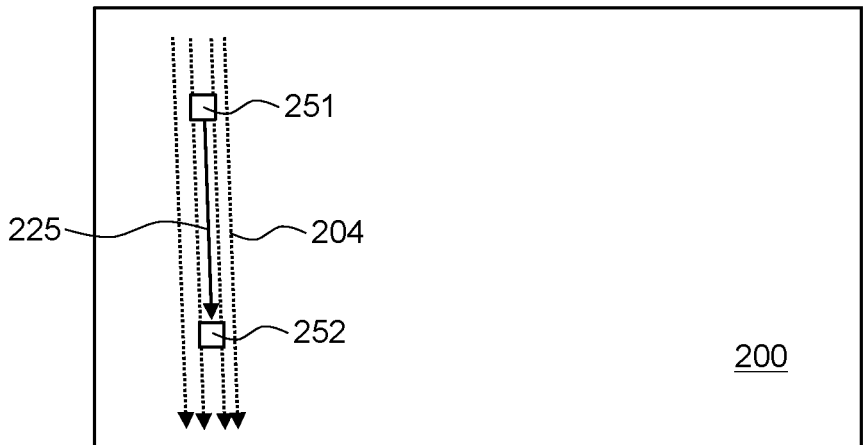
FIG. 2B is a plan view of the scanned FOV with the high-efficiency portion of the out-coupling grating of FIG. 1 running in coordination with scanned pixels or pixel areas.
Figure 2B:
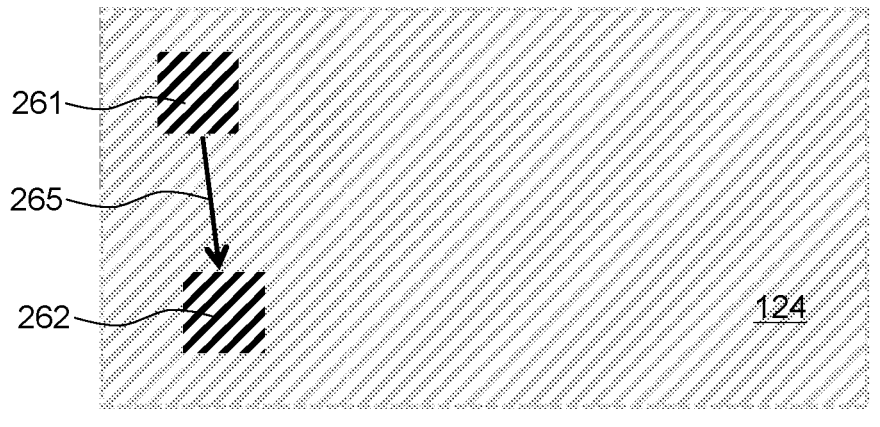

In principle, the scanning may be optimized not only for section-by-section and line-by-line scanning, but also for pixel-by-pixel scanning at a high enough speed of tunability of the out-coupling grating 124. FIG. 2B illustrates a pixel-by-pixel scanning embodiment of a display device with optimized out-coupling of image light. In this embodiment, the image projector 110 scans the entire FOV pixel-by-pixel, as represented by first 251 and second 252 pixels, eventually covering the entire FOV 200. There may be other pixels between the first 251 and second 252 pixels. The first 251 and second 252 pixels may belong to a same straight line of scanning, or to a more complex nonlinear scanning trajectory of a nonlinear resonant scanner including one or more mirrors oscillated at a resonant frequency.

A bottom portion of FIG. 2B is a plan view 202B of the out-coupling grating 124. As the scanning progresses from the first pixel 251 to the second pixel 252, the high-efficiency region of the out-coupling grating 124 shifts from a first location 261 to a second location 262 as indicated with a solid arrow 265. In relation to the scanning described above with reference to FIG. 1, the first FOV portion 141 of FIG. 1 includes the first pixel 261 (FIG. 2B) of the image in angular domain, and the second FOV portion 142 includes the second pixel 262 of the image in angular domain. In some embodiments, the image projector 110 may be replaced with a scanning-type projector not based on tiltable mirrors, e.g. an image projector based on a rastered micro-display panel with a rastered or running area of the displayed portion of the image and an objective lens, or another type of an offset-to-angle optical element or collimator.

Figure 3:
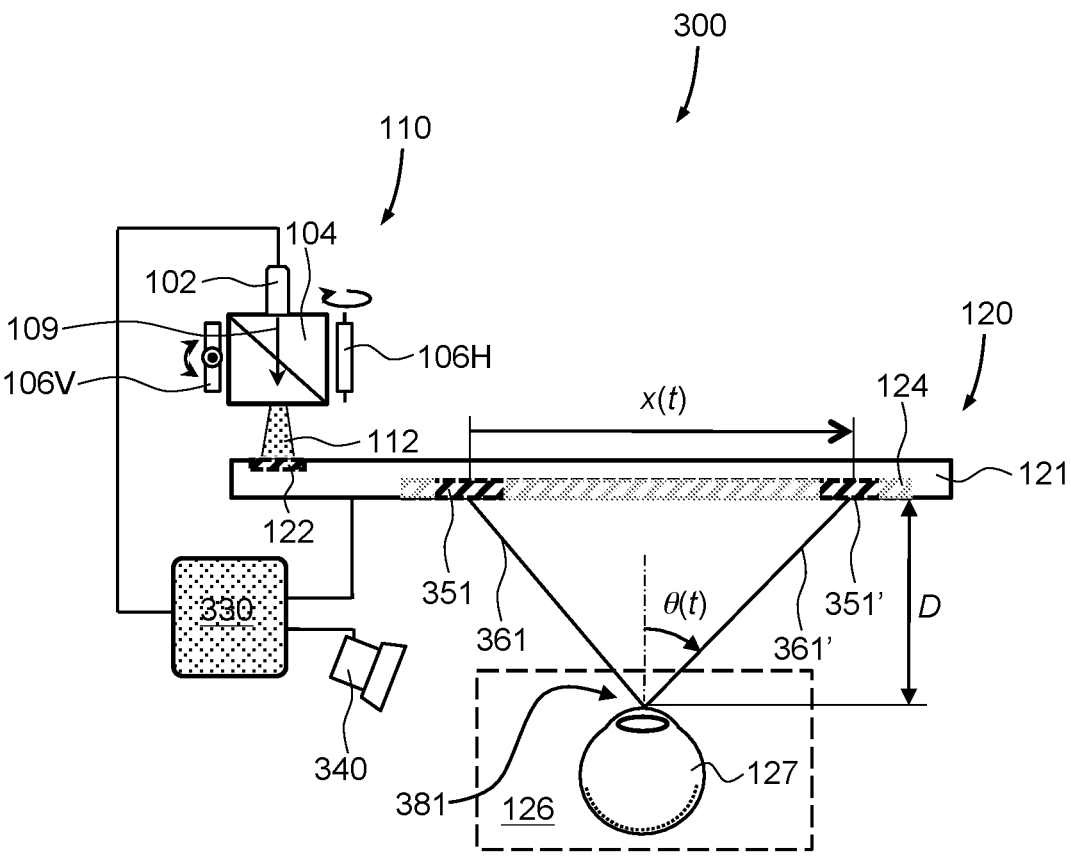
FIG. 3 is a schematic side view of a display device of this disclosure illustrating how a position of the high-efficiency portion of the out-coupling grating depends on the scanning angle and the user's eye position.

Turning to FIG. 3, a display device 300 is similar to the display device 100 of FIG. 1, and includes similar elements. The display device 300 of FIG. 3 includes the image projector 110 for providing the image light 112 carrying an image in angular domain to be displayed to the user's eye 127. The display device 300 further includes the lightguide 120 coupled to the image projector 110. The lightguide 120 include the slab 121 of transparent material. The in-coupler 122 in-couples the image light 112 into the slab 121, which conveys the image light 112 by a series of alternating reflections, e.g. TIRs, forming a zigzag optical path, not shown. The lightguide 120 further includes the out-coupling grating 124 for out-coupling portions of the image light towards the user's eye 127. The portions are spaced apart along the zigzag optical path. The out-coupling efficiency of the out-coupling grating 124 is tunable in a spatially-selective manner for providing a configurable distribution of the image light portions at the eyebox 126.

The display device 300 may further include a controller 330 operably coupled to the image projector 110 and the out-coupling grating 124 of the lightguide 120. The controller 330 may be configured to tune the spatial distribution of the out-coupling efficiency of the out-coupling grating 124 in coordination with operating the image projector 110, to increase the out-coupling of the spaced apart image light portions carrying the currently displayed FOV portion to the eyebox 126, in the following manner.

The scanning image projector 110 scans the collimated light beam 109 generated by the light source 102. The controller 330 tunes the out-coupling efficiency of the out-coupling grating 124 to run a high-efficiency portion 351 of the out-coupling grating 124 along the slab 121 and in coordination with the scanning of the collimated light beam 109 by the scanning image projector 110. The controller 330 keeps a first portion 361 of the light beam at a location 381 of the eye 127 in the eyebox 126 during the scanning. As illustrated in FIG. 3, the first portion 361 is out-coupled by the high-efficiency portion 351 of the out-coupling grating 124. The controller 330 may further adjust the out-coupling efficiency distribution, e.g. the location of low- and high-efficiency portions or areas of the out-coupling grating 124, based on data obtained from an eye tracking system 340 coupled to the controller 330, as explained further below.

The controller 330 scans the collimated light beam 109 in accordance with a pre-defined scanning trajectory. By way of a non-limiting illustrative example, considering a on-dimensional scanning for simplicity, the scanning angle θ of the collimated light beam 109 may be described by a temporal scanning function θ(t), i.e. θ(t) is an instantaneous scanning angle of the collimated light beam 109 at the time moment t. It follows from the geometry of FIG. 3 that an x-coordinate x(t) of the high-efficiency portion 351 may be expressed as $$x(t) = D^* \tan(\theta(t)), \qquad (1)$$

where D is a distance between the out-coupling grating 124 and the eye location 381. As the angle θ of the collimated light beam 109 is scanned, the high-efficiency portion 351 of the out-coupling grating 124 "travels" to a second location 351', while the corresponding out-coupled image light portion 361' remains directed at the eye location 381. The eye location 381 at any given moment of time may be determined by using the eye tracking system 340. When the eye location 381 changes, the controller 330 may adjust the high-efficiency portion 351 movement function x(t) accordingly, to keep the out-coupled image light at the updated eye location at all times.

The controller 330 may be configured to switch off out-coupling grating structures during time intervals when no image light 112 is present, thus making the lightguide 120 more transparent to external light and reducing undesirable rainbow effects and other artifacts. In scanning display configurations such as the display device 300, the scanning may be non-continuous, i.e. the light source 102 may be switched ON and OFF, e.g. to move the tiltable reflector(s) 106H and/or 106V to a beginning of a new scanning line.

Figure 4A:
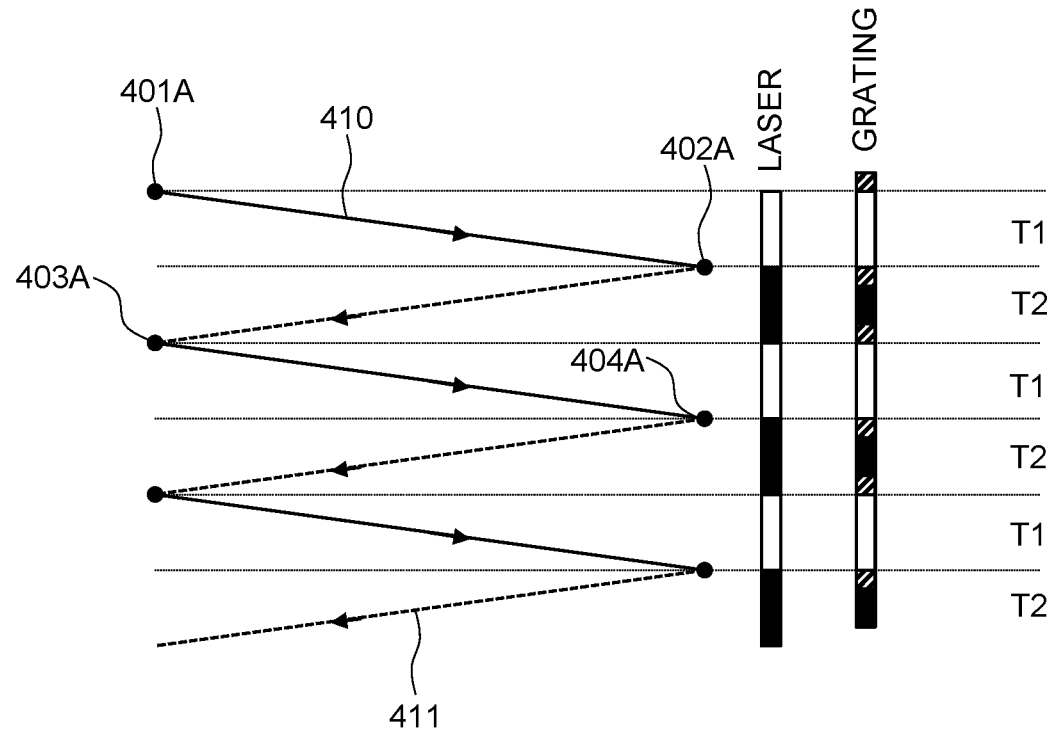
FIG. 4A is an image scanning diagram for the case of unidirectional linear raster type scanning, superimposed with a timing diagram illustrating operation periods of the light source and the switchable out-coupling grating, including transitional periods.

FIG. 4A illustrates an example of a linear raster-type scanning process, in which the image is provided by angularly scanning the collimated light beam 109 in straight lines in one direction only, e.g. left to right. The light source 102 is switched off for the reverse movement of the tiltable reflector(s) 106H and/or 106V. This is illustrated with solid lines 410 for left-to-right movement of the scanned collimated light beam 109 (light source ON), and dashed lines 411 for the reverse movement of the tiltable reflector(s) 106H and/or 106V (light source OFF).

The controller 330 of FIG. 3 may be configured, e.g. hard-wired and/or programmed, to do the following. During a first time interval T1 (FIG. 4A), the controller 330 has the out-coupling grating 124 and the light source 102 (e.g. a laser) in ON state, and performs a scan of the light beam 109 from a first field of view (FOV) point 401A to a second FOV point 402A. During a second, subsequent time interval T2, the controller 330 may cause the scanning projector 110 to not emit the light beam 109, i.e. switch the light source 102 OFF, and switch the out-coupling grating 124 OFF. Then, the process may repeat for third 403A and fourth 404A FOV points, and so on.

In some embodiments, the out-coupling grating 124 may be turned ON in advance to make sure that the out-coupling grating 124 is fully turned ON by the time the light source 102 is turned ON. In FIG. 4A, the ON state is illustrated with white rectangles, the OFF state is illustrated with black rectangles, and a transitional state (from ON to OFF or from OFF to ON) is illustrated with hatched rectangles. In the example of FIG. 4A, the out-coupling grating 124 may be turned ON at least one turn-on time interval in advance of scanning the light beam 109 from a first field of view (FOV) point 401A to a second FOV point 402A. For fast raster-type scans involving tiltable mirrors, the first time interval T1 may be approximately (e.g. within +/−10%) equal to the second time interval T2.

Figure 4B:
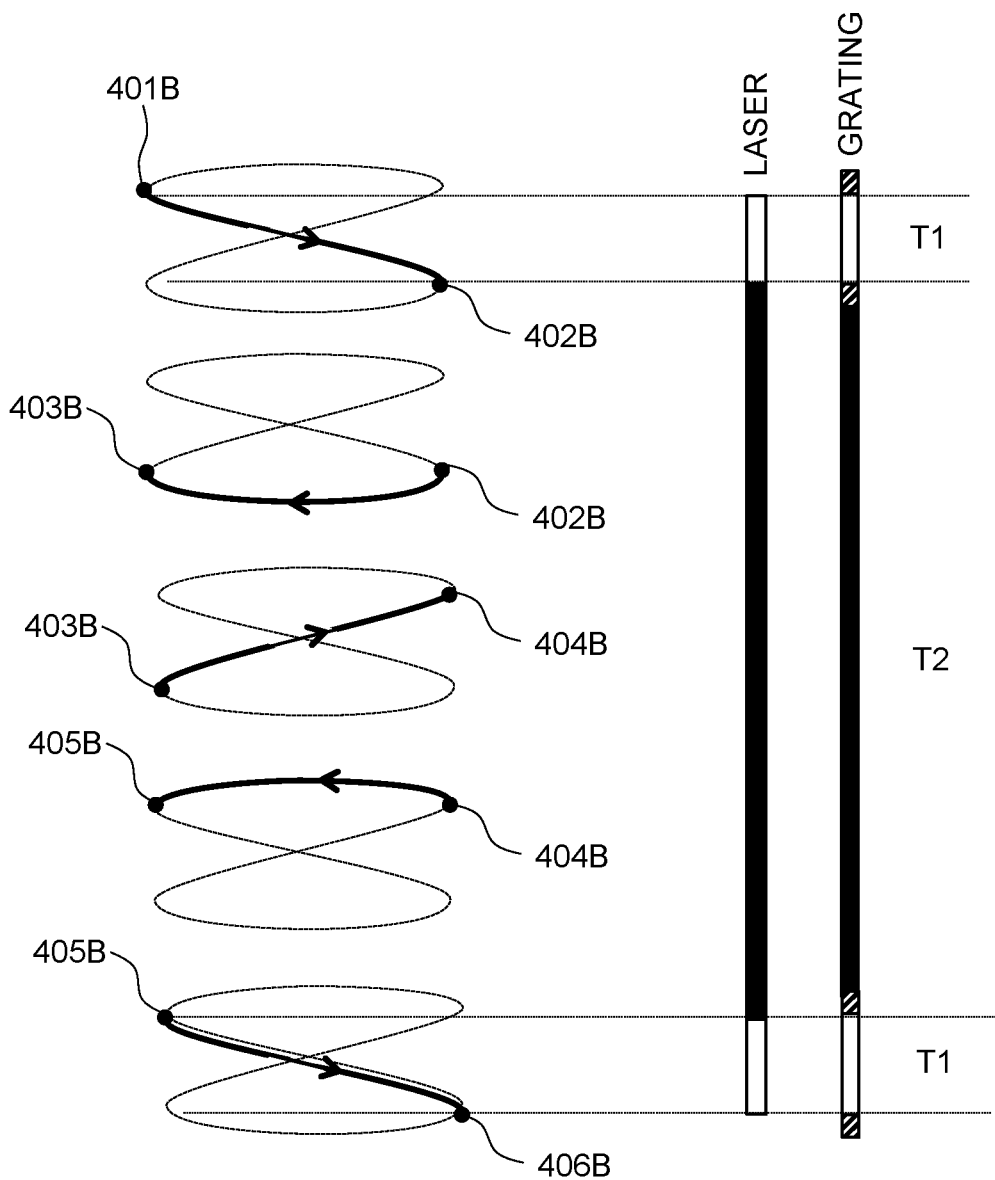
FIG. 4B is an image scanning diagram for the case of unidirectional Lissajous scanning, superimposed with a timing diagram for the light source and the switchable out-coupling grating, including transitional periods.

FIG. 4B illustrates an example of a Lissajous type scanning process. At Lissajous type scanning process, both tiltable reflectors 106H and 106V (FIG. 1 and FIG. 3) are scanned near their respective mechanical resonances, which greatly reduces power consumption and improves scanning speeds. In the example of FIG. 4B, the vertical scan is about 2 times faster than the horizontal scan. To reduce unwanted image artifacts, the scanning may be performed such that image pixels are displayed or "painted" in a consecutive manner in time, with a low spatial gradient of the times at which individual pixels of the image are painted. The absence of such a large spatial gradient facilitates the reduction of dynamic image artifacts which may appear e.g. during a saccadic movement of the viewer's eye.

During the first time interval T1, the controller 330 may have the out-coupling grating 124 and the light source 102 (e.g. a laser) in ON state, and perform a Lissajous scan of the collimated light beam 109 from a first FOV point 401B to a second FOV point 402B. For the duration of a second, subsequent time interval T2, the controller 330 may cause the scanning projector 110 to not emit the light beam 109, i.e. switch the light source 102 OFF, and switch the out-coupling grating 124 OFF. During the second time interval T2, the tiltable reflectors 106H and 106V continue their near-resonant oscillations, going from the second FOV point 402B to a third FOV point 403B; from the third FOV point 403B to a fourth FOV point 404B; and from the fourth FOV point 404B to a fifth FOV point 405B. All this time the light source 102 and the out-coupling grating 124 remain in the OFF state.

By the time the tiltable reflectors 106H and 106V move to the fifth point 405B, which is offset by a small amount, e.g. one pixel, down from the first FOV point 401B, the light source 102 and the out-coupling grating 124 are turned back ON, so the scanning is performed to a sixth FOV point 406B in the ON state, and so on. Similarly to the case of raster type scanning presented in FIG. 4A, the out-coupling grating 124 may be turned ON in advance to allow the transition to the ON state to be completed by the time the scanning reaches the fifth point 405B. To that end, the transition needs to be initiated at least one transition time interval in advance. For the Lissajous type scans, the first time interval T1 is approximately (within +/−10% for example) 4 times smaller than the second time interval T2.

It is to be understood that the Lissajous scanning configuration depicted in FIG. 4B is only a non-limiting illustration. Various Lissajous scanning configurations can lead to the first time interval T1 being approximately three times, or about two to three times smaller than the second time interval T2. Other scanning configurations, including non-resonant scanning, non-raster scanning, etc., may be used as well.

One challenge of using scanning projectors in near-eye displays is a so-called beam walk-off. When the collimated light beam is scanned, the scanned light beam may travel across the surface of the in-coupling grating of a pupil-replicating lightguide. In other words, the location of the spot where the scanned light beam impinges onto the in-coupling grating may change due to the scanning. Scanners based on tiltable reflectors may include pupil relays that reduce the beam walk-off, but some residual beam walk-off may be present even when using pupil relays. The beam walk-off may cause a reduction of the light utilization efficiency of a near-eye display, for the reason illustrated in FIG. 5.

Figures 5, 6A, 6B:
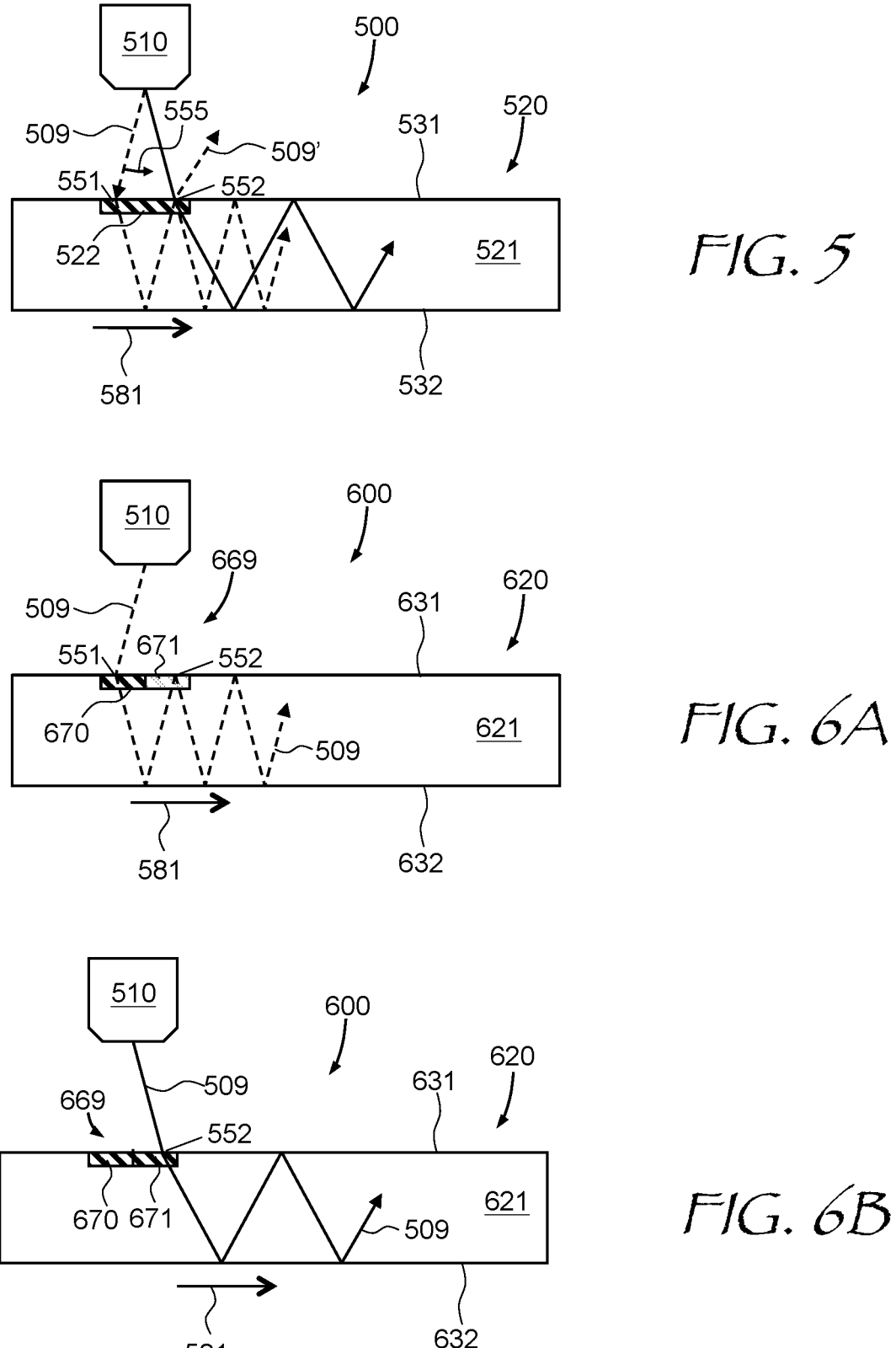
FIG. 5 is a schematic side cross-sectional view of a display device with a non-switchable in-coupling grating of a lightguide, illustrating a partial out-coupling of the in-coupled light beam by an edge of the in-coupling grating at an extreme angle of scanning.
FIGS. 6A and 6B are schematic side cross-sectional views of a display device with a switchable in-coupling grating segment of a lightguide, alleviating the partial out-coupling of the light beam illustrated in FIG. 5, at leftmost (FIG. 6A) and rightmost (FIG. 6B) impinging light beam locations.

Referring to FIG. 5, a display device 500 is similar to the display device 100 of FIG. 1 and the display device 300 of FIG. 3. A scanning projector 510 of the display device 500 angularly scans a collimated light beam 509 impinging onto an in-coupling grating 522 of a lightguide 520, e.g. a pupil-replicating lightguide, which includes a slab 521 of transparent material such as glass, for example. The purpose of the in-coupling grating 522 is to in-couple the collimated light beam 509 by redirecting the light beam 509 in a first direction 581 for propagation in the slab 521 along a zigzag light path, which is defined by a series of internal reflections of the collimated light beam 509 from the top 531 and bottom 532 opposed surfaces of the slab 521.

The scanning projector 510 of FIG. 5 has a beam walkoff, and the in-coupling grating 522 needs to be wide enough to accommodate the beam walkoff. During scanning of the light beam 509, the light beam 509 shifts from a first 551 to a second 552 location on the in-coupling grating 522, in the first direction 581. At the first location 551, the impinging light beam 509, shown in dashed lines, diffracts on the in-coupling grating 522 and changes its direction of propagation, the change of direction being generally represented by the arrow of the first direction 581. The light beam 509 propagates through the slab 521, reflects from its bottom surface 532, and impinges onto the in-coupling grating 522 from inside the slab 521 at the second location 552, which is offset relative to the first location 551 in the first direction 581. A portion of the light beam 509 diffracts out of the slab 521 as indicated by a dashed arrow 509', reducing the optical power of the in-coupled light beam 509 propagating in the slab 521.

As the light beam 509 is scanned as indicated by a curved arrow 555, the light beam 509 shifts from the first location 551 to the second location 552. At the second location 552, the light beam 509, shown this time with solid lines, propagates through the slab 521, reflects from its bottom surface 532, and proceeds to propagate in the slab 521 without ever encountering the in-coupling grating 522 again. Therefore, light efficiency in the configuration of FIG. 5A depends on the local scanning angle, which makes a portion of the displayed scanned image, corresponding to the first location 551 and its surroundings, appear dimmer than the rest of the image. Although the image may be pre-calibrated to reduce this effect, even when the image is pre-calibrated, the light utilization efficiency is reduced. It is noted that the scanning projector 510 may also scan the light beam 509 in a direction perpendicular to the first direction 581, i.e. in and out of the plane of FIG. 5, but that scanning causes no problem since it is perpendicular to the direction of the light beam 509 displacement, i.e. the first direction 581.

In accordance with this disclosure, the image non-uniformity and/or reduced light utilization efficiency caused by beam walk-off may be alleviated by making the in-coupling grating switchable. Referring for a non-limiting illustrative example to FIGS. 6A and 6B, a display device 600 is similar to the display device 500 of FIG. 5 and includes similar elements, with an exception of a lightguide 620, e.g. a pupil-replicating lightguide, which includes a transparent slab 621 supporting a switchable in-coupling grating 669. In operation, the scanning projector 510 (FIG. 6A) angularly scans the collimated light beam 509 impinging onto the switchable in-coupling grating 669. In the implementation of FIGS. 6A and 6B, the switchable in-coupling grating 669 has a non-switchable grating segment 670 and a first switchable grating segment 671 conterminous with the non-switchable grating segment 670 and offset relative to the non-switchable grating segment 670 in the first direction 581.

At the first location 551 (FIG. 6A), the impinging light beam 509 propagates through the slab 621, reflects from its back surface 632, and impinges onto the switchable in-coupling grating 669 from inside the slab 621 at the second location 552 at a top surface 631 of the slab 621. A diffraction efficiency of the first switchable grating segment 671 at the second location 552 is lessened to lessen the diffraction of the light beam 509 at the second location 552 while preserving the diffraction efficiency of the switchable in-coupling grating 669 at the first location, i.e. the location of the non-switchable grating segment 670. The reduction of the optical power of the in-coupled light beam 509 propagating in the slab 621 is thereby avoided.

As the light beam 509 moves from the first location 551 to the second location 552, the light beam 509, shown in solid lines, impinges onto the first grating segment 671 (FIG. 6B). At this time, the diffraction efficiency of the switchable in-coupling grating 669 at the second location 552, i.e. the diffraction efficiency of the first grating segment 671 of the switchable in-coupling grating 669, is increased to increase the diffraction of the light beam 509 at the second location 552. The light beam 509 propagates through the slab 621, reflects from its bottom surface 532, and proceeds to propagate in the slab 621 without ever encountering the switchable in-coupling grating 669 again. Therefore, with the switchable in-coupling grating 669, the in-coupling efficiency is preserved at both the first 551 and second 552 locations, and the above mentioned reduction of the optical power of the in-coupled light beam 509 propagating in the slab 621 is avoided. It is to be noted that this method of avoiding the reduction of in-coupling efficiency works not only for scanning projectors using tiltable mirrors, but also for scanning projectors including a rastered microdisplay panel coupled to a collimator. It is further noted that the scanning projector 510 may perform 2D scanning about a pair of mutually perpendicular fast and slow axes. The slow scanning axis of the scanning projector 510 may be selected for the slow scanning to be along the first direction 581, to relax the switching time requirement for the switchable in-coupling grating 669.

An in-coupling grating of a display device using a scanning projector may include more than one switchable segment. Referring for a non-limiting illustrative example to FIGS. 7A, 7B, and 7C, a display device 700 is similar to the display device 100 of FIG. 1, the display device 300 of FIG. 3, and the display device 600 of FIGS. 6A and 6B, and includes similar elements, with a difference being that a switchable in-coupling grating 769 supported by a slab 721. The switchable in-coupling grating 769 has two independently switchable segments, a first switchable segment 771 and a second switchable segment 772. The scanning projector 510 of the display device 700 provides the light beam 509 scanned in the first direction 581 in going from FIG. 7A to 7B to 7C.

In operation, the light beam 509 impinges onto the in-coupling grating 769, which, as noted above, has a switchable, spatially variant diffraction efficiency. To that end, the in-coupling grating 769 includes a non-switchable segment 770 and first 771 and second 772 switchable segments. The first switchable segment 771 is conterminous with the non-switchable segment 670 and offset relative to the non-switchable segment 770 in the first direction 581, and the second switchable segment 772 is conterminous with the first switchable segment 771, and is offset relative to the first switchable segment 771 in the first direction 581.

The light beam 509 is scanned in the first direction 581. At a first moment of time depicted in FIG. 7A, the light beam 509 impinges onto the non-switchable segment 770 of the in-coupling grating 769, with both the first 771 and second 772 switchable segments turned OFF, i.e. their diffraction efficiencies are switched to a low-diffracting or a non-diffracting state, such that the light beam 509 substantially does not diffract when impinging onto the first 771 and second 772 switchable segments when impinging onto the first 771 and second 772 switchable segments from inside the slab 721.

At a second moment of time depicted in FIG. 6B, the light beam 509 impinges onto the first switchable segment 771 of the in-coupling grating 769, with the second 772 switchable segment turned OFF such that the light beam 509 substantially does not diffract on the second switchable segment 772 when impinging onto the second switchable segment 772 from inside the slab 721. At a third moment of time depicted in FIG. 7C, the light beam 509 impinges onto the second switchable segment 772 of the in-coupling grating 769, with both the first 771 and second 772 switchable segments turned ON, i.e. their diffraction efficiencies are switched to a high-diffracting state. The light beam 509 impinging onto the second switchable segment 772 does not diffract on the switchable in-coupling grating 769, because the light beam 509 is redirected in the first direction 581, i.e. away from the non-switchable segment 770 and the first switchable segment 771 of the switchable in-coupling grating 769. It is noted that the number of conterminous switchable grating segments of an in-coupling grating may be more than two; it further noted that in some embodiments disclosed herein, both the in-coupling and out-coupling gratings of a lightguide may be switchable.

Non-limiting examples of spatially switchable/tunable gratings usable in lightguides and displays of this disclosure will now be presented. Referring first to FIG. 8, a tunable liquid crystal (LC) surface-relief grating 800 may be used as the out-coupling grating 124 of FIGS. 1 and 3, the first in-coupling grating segment 671 of FIGS. 6A and 6B, and/or the first 771 and second 772 in-coupling grating segments of FIGS. 7A-7C. The tunable LC surface-relief grating 800 includes a first substrate 801 supporting a first conductive layer 811 and a surface-relief grating structure 804 having a plurality of ridges 806 extending from the first substrate 801 and/or the first conductive layer 811.

A second substrate 802 is spaced apart from the first substrate 801. The second substrate 802 supports a second conductive layer 812. A cell is formed by the first 811 and second 812 conductive layers. The cell is filled with an LC fluid, forming an LC layer 808. The LC layer 808 includes nematic LC molecules 810, which may be oriented by an electric field across the LC layer 808. The electric field may be provided by applying a voltage V to the first 811 and second 812 conductive layers or conductive electrodes. At least one of the first 811 and second 812 conductive layers may be pixelated to provide the spatially selective application of the voltage for spatial selectivity of the tuning.

The surface-relief grating structure 804 may be formed from a polymer with an isotropic refractive index $n_p$ of about 1.5, for example. The LC fluid has an anisotropic refractive index. For light polarization parallel to a director of the LC fluid, i.e. to the direction of orientation of the nematic LC molecules 810, the LC fluid has an extraordinary refractive index $n_e$, which may be higher than an ordinary refractive index $n_o$ of the LC fluid for light polarization perpendicular to the director. For example, the extraordinary refractive index $n_e$ may be about 1.7, and the ordinary refractive index $n_o$ may be about 1.5, i.e. matched to the refractive index $n_p$ of the surface-relief grating structure 804.

When the voltage V is not applied (left side of FIG. 8), the LC molecules 810 are aligned approximately parallel to the grooves of the surface-relief grating structure 804. At this configuration, a linearly polarized light beam 821 with e-vector oriented along the grooves of the surface-relief grating structure 804 will undergo diffraction, since the surface-relief grating structure 804 will have a non-zero refractive index contrast. When the voltage V is applied (right side of FIG. 8), the LC molecules 810 are aligned approximately perpendicular to the grooves of the surface-relief grating structure 804. At this configuration, a linearly polarized light beam 821 with e-vector oriented along the grooves of the surface-relief grating structure 804 will not undergo diffraction because the surface-relief grating structure 804 will appear to be index-matched and, accordingly, will have a substantially zero refractive index contrast. For the linearly polarized light beam 821 with e-vector oriented perpendicular to the grooves of the surface-relief grating structure 804, no diffraction will occur in either case (i.e. when the voltage is applied and when it is not) because at this polarization of the linearly polarized light beam 821, the surface-relief grating structure 804 are index-matched. Thus, the tunable LC surface-relief grating 800 can be switched on and off (for polarized light) by controlling the voltage across the LC layer 808. Several such gratings with differing pitch/slant angle/refractive index contrast may be used to switch between several grating configurations.

Figures 7A, 7B, 7C:
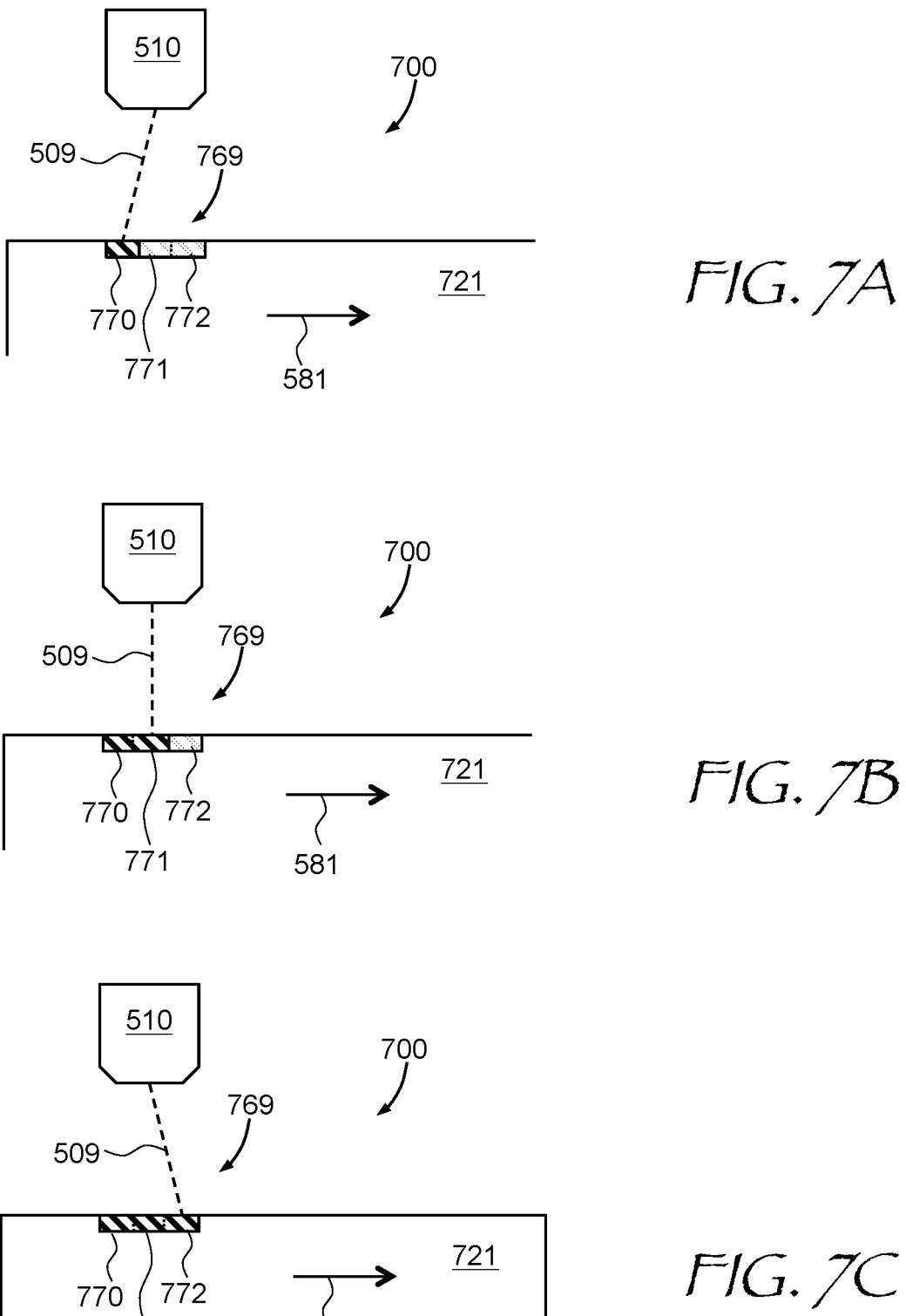
FIGS. 7A, 7B, and 7C are schematic side cross-sectional views of a display device with two switchable in-coupling grating segments, at leftmost (FIG. 7A), central (FIG. 7B), and rightmost (FIG. 7C) impinging light beam locations.
Figure 8:
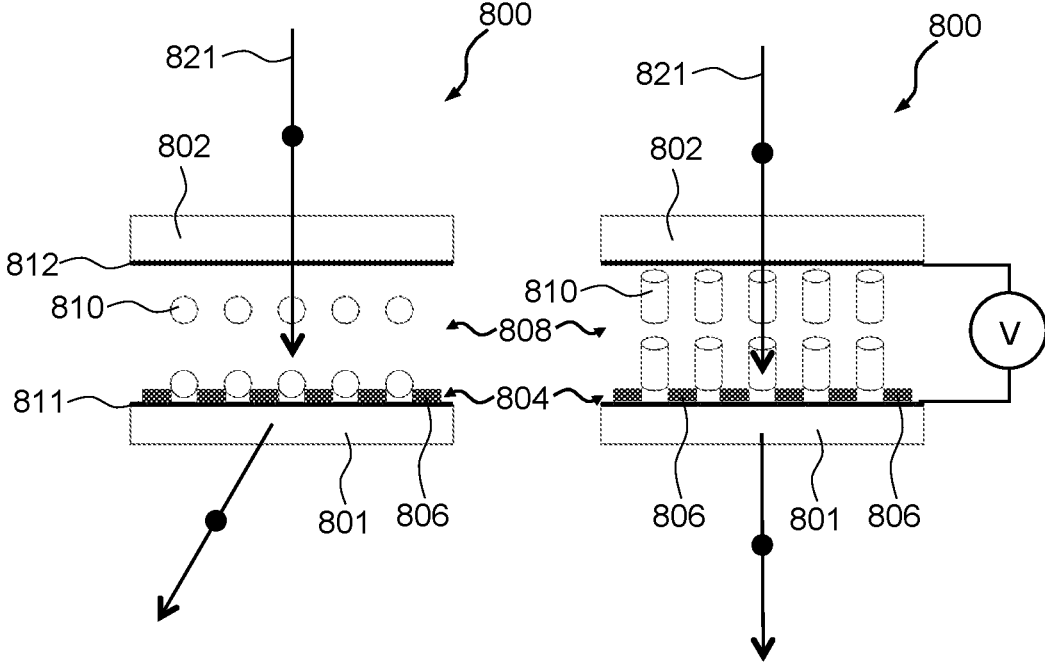
FIG. 8 shows side cross-sectional views of a tunable liquid crystal (LC) surface-relief grating usable in a lightguide of this disclosure.

Referring now to FIG. 9A, a Pancharatnam-Berry phase (PBP) LC switchable grating 900 may be used as the out-coupling grating 124 of FIGS. 1 and 3, the first in-coupling grating segment 671 of FIGS. 6A and 6B, and/or the first 771 and second 772 in-coupling grating segments of FIGS. 7A-7C. The PBP LC switchable grating 900 of FIG. 9A includes LC molecules 902 in an LC layer 904. The LC molecules 902 are disposed in XY plane at a varying in-plane orientation depending on the X coordinate. The orientation angle φ(x) of the LC molecules 902 in the PBP LC switchable grating 900 is given by $$\phi(x)=\pi x/T=\pi x \sin \theta/\lambda_0 \qquad (2)$$

where do is the wavelength of impinging light, T is a pitch of the PBP LC switchable grating 900, and 0 is a diffraction angle given by $$\theta=\sin^{-1}(\lambda_0/T) \qquad (3)$$

The azimuthal angle φ varies continuously across the surface of an LC layer 904 parallel to XY plane as illustrated in FIG. 9B. The variation has a constant period equal to T. The optical phase delay P in the PBP LC grating 900 of FIG. 9A is due to the PBP effect, which manifests P(x)=2φ(x) when the optical retardation R of the LC layer 904 is equal to $\lambda_0/2$.

FIGS. 10A and 10B illustrate the operation of the PBP LC switchable grating 900 of FIG. 9A. The PBP LC switchable grating 900 includes the LC layer 904 (FIG. 9A) disposed between parallel substrates configured for applying an electric field across the LC layer 904. The LC molecules 902 are oriented substantially parallel to the substrates in absence of the electric field, and substantially perpendicular to the substrates in presence of the electric field.

In FIG. 10A, the PBP LC switchable grating 900 is in OFF state, such that its LC molecules 902 (FIGS. 9A, 9B) are disposed predominantly parallel to the substrate plane, that is, parallel to XY plane in FIG. 10A. When an incoming light beam 1015 is left-circular polarized (LCP), the PBP LC switchable grating 900 redirects the light beam 1015 upwards by a pre-determined non-zero angle, and the beam 1015 becomes right-circular polarized (RCP). The RCP deflected beam 1015 is shown with solid lines. When the incoming light beam 1015 is right-circular polarized (RCP), the PBP LC switchable grating 900 redirects the beam 1015 downwards by a pre-determined non-zero angle, and the beam 1015 becomes left-circular polarized (LCP). The LCP deflected beam 1015 is shown with dashed lines. Applying a voltage V to the PBP LC switchable grating 900 reorients the LC molecules along Z-axis, i.e. perpendicular to the substrate plane as shown in FIG. 10B. At this orientation of the LC molecules 902, the PBP structure is erased, and the light beam 1015 retains its original direction, whether it is LCP or RCP. Thus, the active PBP LC grating 900 is a tunable grating, i.e. it has a variable beam steering property. Furthermore, the operation of the active PBP LC grating 900 may be controlled by controlling the polarization state of the impinging light beam 1015.

Figure 11A:
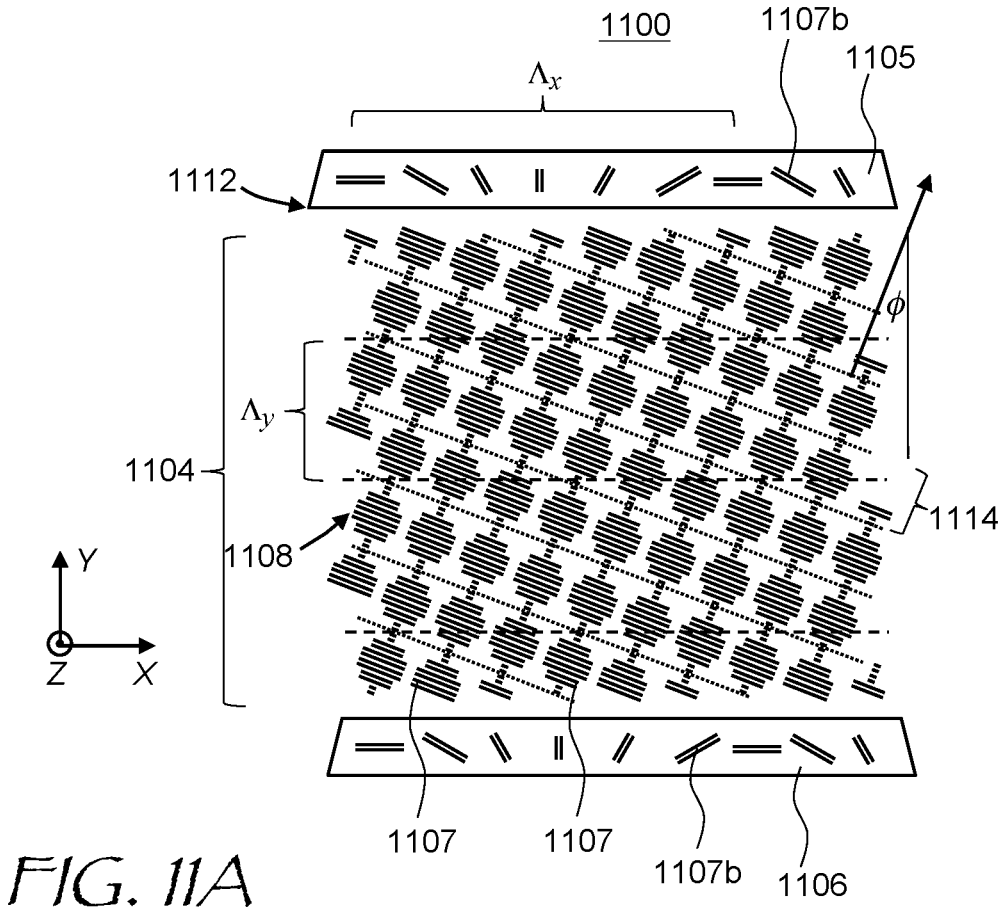
FIG. 11A is a side cross-sectional view of a polarization volume grating (PVH) usable in a lightguide of this disclosure.

Turning to FIG. 11A, a polarization volume hologram (PVH) grating 1100 may be used as the out-coupling grating 124 of FIGS. 1 and 3, the first in-coupling grating segment 671 of FIGS. 6A and 6B, and the first 771 and second 772 in-coupling grating segments of FIGS. 7A-7C. The PVH grating 1100 of FIG. 11A includes an LC layer 1104 bound by opposed top 1105 and bottom 1106 parallel surfaces. The LC layer 1104 may include an LC fluid containing rod-like LC molecules 1107 with positive dielectric anisotropy, i.e. nematic LC molecules. A chiral dopant may be added to the LC fluid, causing the LC molecules in the LC fluid to self-organize into a periodic helical configuration including helical structures 1108 extending between the top 1105 and bottom 1106 parallel surfaces of the LC layer 1104. Such a configuration of the LC molecules 1107, termed herein a cholesteric configuration, includes a plurality of helical periods p, e.g. at least two, at least five, at least ten, at least twenty, or at least fifty helical periods p between the top 1105 and bottom 1106 parallel surfaces of the LC layer 1104.

Boundary LC molecules 1107b at the top surface 1105 of the LC layer 1104 may be oriented at an angle to the top surface 1105. The boundary LC molecules 1107b may have a spatially varying azimuthal angle, e.g. linearly varying along X-axis parallel to the top surface 1105, as shown in FIG. 11A. To that end, an alignment layer 1112 may be provided at the top surface 1105 of the LC layer 1104. The alignment layer 1112 may be configured to provide the desired orientation pattern of the boundary LC molecules 1107b, such as the linear dependence of the azimuthal angle on the X-coordinate. A pattern of spatially varying polarization directions of the UV light may be selected to match a desired orientation pattern of the boundary LC molecules 1107b at the top surface 1105 and/or the bottom surface 1106 of the LC layer 1104. When the alignment layer 1112 is coated with the cholesteric LC fluid, the boundary LC molecules 1107b are oriented along the photopolymerized chains of the alignment layer 1112, thus adopting the desired surface orientation pattern. Adjacent LC molecules adopt helical patterns extending from the top 1105 to the bottom 1106 surfaces of the LC layer 1104, as shown.

The boundary LC molecules 1107b define relative phases of the helical structures 1108 having the helical period p. The helical structures 1108 form a volume grating comprising helical fringes 1114 tilted at an angle φ, as shown in FIG. 11A. The steepness of the tilt angle φ depends on the rate of variation of the azimuthal angle of the boundary LC molecules 1107b at the top surface 1105 and p. Thus, the tilt angle φ is determined by the surface alignment pattern of the boundary LC molecules 1107b at the alignment layer 1112. The volume grating has a period $\Lambda_x$ along X-axis and $\Lambda_y$ along Y-axis. In some embodiments, the periodic helical structures 1108 of the LC molecules 1107 may be polymer-stabilized by mixing in a stabilizing polymer into the LC fluid, and curing (polymerizing) the stabilizing polymer.

The helical nature of the fringes 1114 of the volume grating makes the PVH grating 1100 preferably responsive to light of polarization having one particular handedness, e.g. left- or right-circular polarization, while being substantially non-responsive to light of the opposite handedness of polarization. Thus, the helical fringes 1114 make the PVH grating 1100 polarization-selective, causing the PVH grating

Figure 11B:
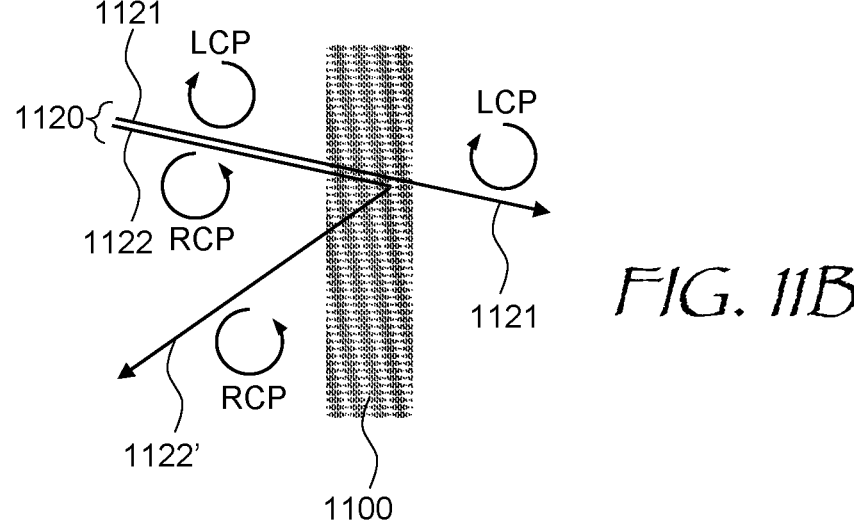
FIG. 11B is a diagram illustrating optical performance of the PVH of FIG. 11A.

1100 to diffract light of only one handedness of circular polarization. This is illustrated in FIG. 11B, which shows a light beam 1120 impinging onto the PVH grating 1100. The light beam 1120 includes a left circular polarized (LCP) beam component 1121 and a right circular polarized (RCP) beam component 1122. The LCP beam component 1121 propagates through the PVH grating 1100 substantially without diffraction. Herein, the term "substantially without diffraction" means that, even though an insignificant portion of the beam (the LCP beam component 1121 in this case) might diffract, the portion of the diffracted light energy is so small that it does not impact the intended performance of the PVH grating 1100. The RCP beam component 1122 of the light beam 1120 undergoes diffraction, producing a diffracted beam 1122'. The polarization selectivity of the PVH grating 1100 results from the effective refractive index of the grating being dependent on the relationship between the handedness, or chirality, of the impinging light beam and the handedness, or chirality, of the grating fringes 1114. Changing the handedness of the impinging light may be used to switch the performance of the PVH grating 1100. The PVH grating 1100 may also be made tunable by applying voltage to the LC layer 1104, which distorts or erases the above-described helical structure. It is further noted that sensitivity of the PVH 1100 to right circular polarized light in particular is only meant as an illustrative example. When the handedness of the helical fringes 1114 is reversed, the PVH 1100 may be made sensitive to left circular polarized light. Thus, the operation of the PVH 1100 may be controlled by controlling the polarization state of the impinging light beam 1120. Furthermore, in some embodiments the PVH 1100 may be made tunable by application of electric field across the LC layer 1104, which erases the periodic helical structures 1108.

Figure 12A:
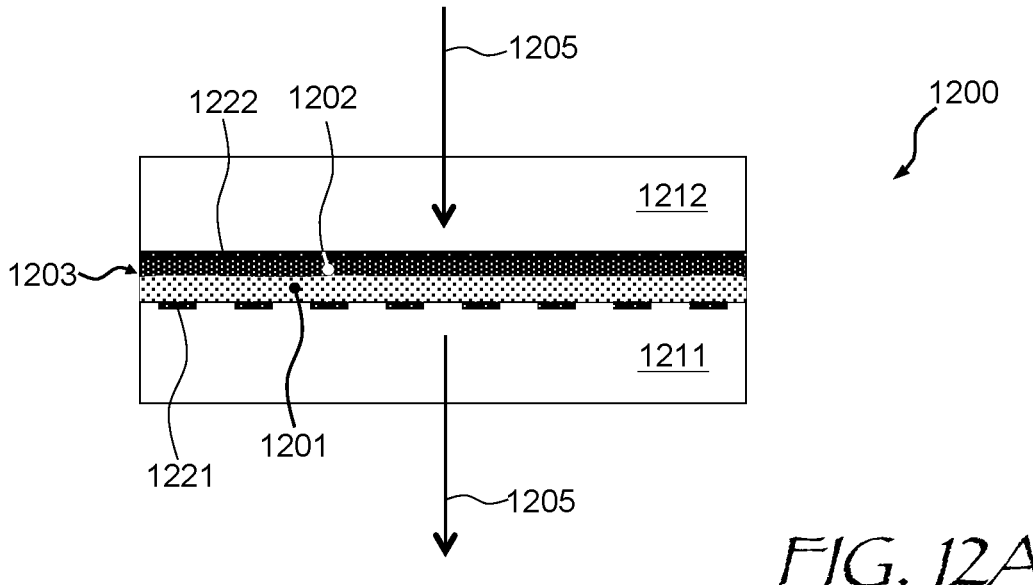
FIG. 12A is a side cross-sectional view of a fluidic surface-relief grating usable in a lightguide of this disclosure, in an OFF state.
Figure 12B:
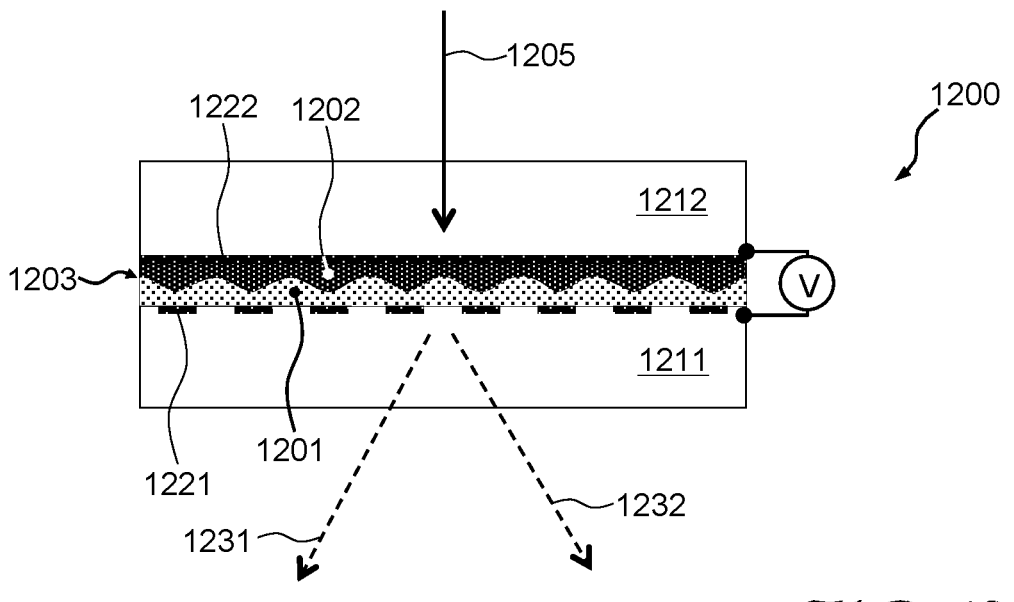
FIG. 12B is a side cross-sectional view of the fluidic surface-relief grating of FIG. 12A in an ON state.

Referring now to FIGS. 12A and 12B, a fluidic surface-relief grating 1200 may be used as the out-coupling grating 124 of FIGS. 1 and 3, the first in-coupling grating segment 671 of FIGS. 6A and 6B, and/or the first 771 and second 772 in-coupling grating segments of FIGS. 7A-7C, and more generally as a switchable in-coupling and/or out-coupling grating. The fluidic surface-relief grating 1200 of FIGS. 12A and 12B includes first 1201 and second 1202 immiscible fluids separated by an inter-fluid boundary 1203. One of the fluids may be a hydrophobic fluid such as oil, e.g. silicone oil, while the other fluid may be water-based. One of the first 1201 and second 1202 fluids may be a gas in some embodiments. The first 1201 and second 1202 fluids may be contained in a cell formed by first 1211 and second 1212 substrates supporting first 1221 and second 1222 electrode structures. The first 1221 and/or second 1222 electrode structures may be at least partially transparent, absorptive, and/or reflective.

At least one of the first 1221 and second 1222 electrode structures may be pixelated/segmented/patterned for imposing a spatially variant electric field onto the 1201 and second 1202 fluids. For example, in 12A and 12B, the first electrode 1221 is patterned, and the second electrodes 1222 is not patterned, i.e. the second electrodes 1222 is a backplane electrode. In the embodiment shown, both the first 1221 and second 1222 electrodes are substantially transparent. For example, the first 1221 and second 1222 electrodes may be indium tin oxide (ITO) electrodes. The individual portions of a patterned electrode may be individually addressable. In some embodiments, the patterned electrode 1221 may be replaced with a continuous, non-patterned electrode coupled to a patterned dielectric layer for creating a spatially non-uniform electric field across the first 1201 and second 1202 fluids.

FIG. 12A shows the fluidic surface-relief grating 1200 in a non-driven state when no electric field is applied across the inter-fluid boundary 1203. When no electric field is present, the inter-fluid boundary 1203 is straight and smooth; accordingly, a light beam 1205 impinging onto the fluidic surface-relief grating 1200 does not diffract, propagating right through as illustrated. FIG. 12B shows the fluidic surface-relief grating 1200 in a driven state when a voltage V is applied between the first 1221 and second 1222 electrodes, producing a spatially variant electric field across the first 1201 and second 1202 fluids separated by the inter-fluid boundary 1203. The application of the spatially variant electric field causes the inter-fluid boundary 1203 to distort as illustrated in FIG. 12B, forming a periodic variation of effective refractive index, i.e. a surface-relief diffraction grating. The light beam 1205 impinging onto the fluidic surface-relief grating 1200 will diffract, forming first 1231 and second 1232 diffracted sub-beams. By varying the amplitude of the applied voltage V, the strength of the fluidic surface-relief grating 1200 may be varied. By applying different patterns of the electric field e.g. with individually addressable sub-electrodes or pixels of the first electrode 1221, the grating period and, accordingly, the diffraction angle, may be varied. More generally, varying the effective voltage between separate sub-electrodes or pixels of the first electrode 1221 may result in a three-dimensional conformal change of the fluidic interface i.e. the inter-fluid boundary 1203 inside the fluidic volume to impart a desired optical response to the fluidic surface-relief grating 1200. The applied voltage pattern may be pre-biased to compensate or offset gravity effects, i.e. gravity-caused distortions of the inter-fluid boundary 1203.

The thickness of the first 1221 and second 1222 electrodes may be e.g. between 12 nm and 50 nm. The materials of the first 1221 and second 1222 electrodes besides ITO may be e.g. indium zinc oxide (IZO), zinc oxide (ZO), indium oxide (IO), tin oxide (TO), indium gallium zinc oxide (IGZO), etc. The first 1201 and second 1202 fluids may have a refractive index difference of at least 0.1, and may be as high as 0.2 and higher. One of the first 1201 or second 1202 fluids may include polyphenylether, 1,3-bis(phenylthio)benzene, etc. The first 1211 and/or second 1212 substrates may include e.g. fused silica, quartz, sapphire, etc. The first 1211 and/or second 1212 substrates may be straight or curved, and may include vias and other electrical interconnects. The applied voltage may be varied in amplitude and/or duty cycle. The applied voltage can change polarity and/or be bipolar. Individual first 1201 and/r second 1202 fluid layers may have a thickness of between 0.5-5 micrometers, more preferably between 0.5-2 micrometer.

To separate the first 1201 and second 1202 fluids, surfactants containing one hydrophilic end functional group and one hydrophobic end functional group may be used. The examples of a hydrophilic end functional group are hydroxyl, carboxyl, carbonyl, amino, phosphate, sulfhydryl. The hydrophilic functional groups may also be anionic groups such as sulfate, sulfonate, carboxylates, phosphates, for example. Non-limiting examples of a hydrophobic end functional group are aliphatic groups, aromatic groups, fluorinated groups. For example, when polyphenyl thioether and fluorinated fluid may be selected as a fluid pair, a surfactant containing aromatic end group and flurorinated end group may be used. When phenyl silicone oil and water are selected as the fluid pair, a surfactant containing aromatic end group and hydroxyl (or amino, or ionic) end group may be used. These are only non-limiting examples.

Figure 13:
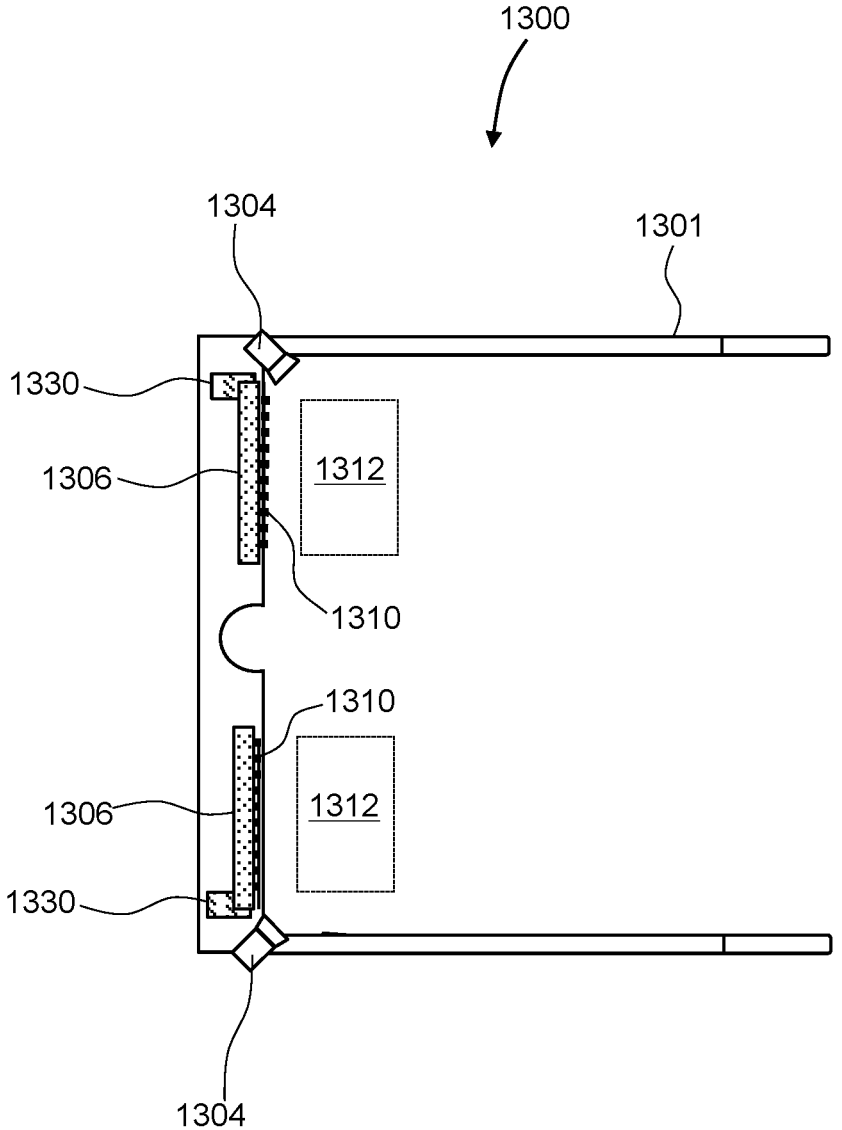
FIG. 13 is a view of an augmented reality (AR) display of this disclosure having a form factor of a pair of eyeglasses.

Referring now to FIG. 13, an augmented reality (AR) near-eye display 1300 is an embodiment of the display device 100 of FIG. 1, the display device 300 of FIG. 3, the display device 500 of FIG. 5, the display device 600 of FIGS. 6A and 6B, and/or the display device 700 of FIGS. 7A-7C. The AR near-eye display 1300 of FIG. 13 includes a frame 1301 supporting, for each eye: a light engine or image projector 1330 for providing an image light beam carrying an image in angular domain, a pupil-replicating lightguide 1306 including any of the waveguides disclosed herein, for providing multiple offset portions of the image light beam to spread the image in angular domain across an eyebox 1312, and a plurality of eyebox illuminators 1310, shown as black dots, spread around a clear aperture of the pupil-replicating lightguide 1306 on a surface that faces the eyebox 1312. An eye-tracking camera 1304 may be provided for each eyebox 1312.

The purpose of the eye-tracking cameras 1304 is to determine position and/or orientation of both eyes of the user. The eyebox illuminators 1310 illuminate the eyes at the corresponding eyeboxes 1312, allowing the eye-tracking cameras 1304 to obtain the images of the eyes, as well as to provide reference reflections i.e. glints. The glints may function as reference points in the captured eye image, facilitating the eye gazing direction determination by determining position of the eye pupil images relative to the glints images. To avoid distracting the user with the light of the eyebox illuminators 1310, the latter may be made to emit light invisible to the user. For example, infrared light may be used to illuminate the eyeboxes 1312.

Figure 14:
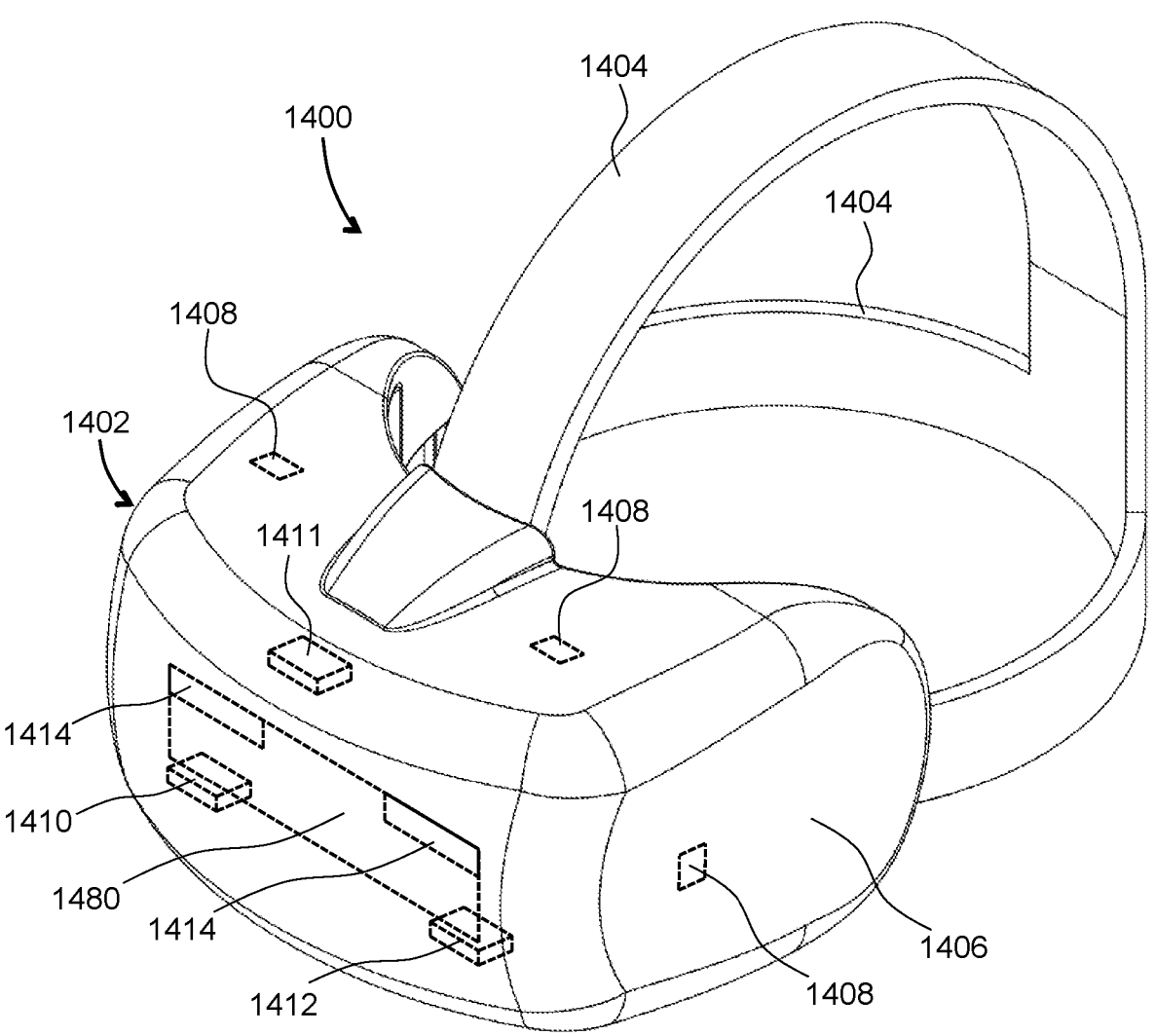
FIG. 14 is a three-dimensional view of a head-mounted display (HMD) of this disclosure.

Turning to FIG. 14, an HMD 1400 is an example of an AR/VR wearable display system which encloses the user's face, for a greater degree of immersion into the AR/VR environment. The HMD 1400 may generate the entirely virtual 3D imagery. The HMD 1400 may include a front body 1402 and a band 1404 that can be secured around the user's head. The front body 1402 is configured for placement in front of eyes of a user in a reliable and comfortable manner. A display system 1480 may be disposed in the front body 1402 for presenting AR/VR imagery to the user. The display system 1480 may include any of the display devices and waveguides disclosed herein. Sides 1406 of the front body 1402 may be opaque or transparent.

In some embodiments, the front body 1402 includes locators 1408 and an inertial measurement unit (IMU) 1410 for tracking acceleration of the HMD 1400, and position sensors 1412 for tracking position of the HMD 1400. The IMU 1410 is an electronic device that generates data indicating a position of the HMD 1400 based on measurement signals received from one or more of position sensors 1412, which generate one or more measurement signals in response to motion of the HMD 1400. Examples of position sensors 1412 include: one or more accelerometers, one or more gyroscopes, one or more magnetometers, another suitable type of sensor that detects motion, a type of sensor used for error correction of the IMU 1410, or some combination thereof. The position sensors 1412 may be located external to the IMU 1410, internal to the IMU 1410, or some combination thereof.

The locators 1408 are traced by an external imaging device of a virtual reality system, such that the virtual reality system can track the location and orientation of the entire HMD 1400. Information generated by the IMU 1410 and the position sensors 1412 may be compared with the position and orientation obtained by tracking the locators 1408, for improved tracking accuracy of position and orientation of the HMD 1400. Accurate position and orientation is important for presenting appropriate virtual scenery to the user as the latter moves and turns in 3D space.

The HMD 1400 may further include a depth camera assembly (DCA) 1411, which captures data describing depth information of a local area surrounding some or all of the HMD 1400. The depth information may be compared with the information from the IMU 1410, for better accuracy of determination of position and orientation of the HMD 1400 in 3D space.

The HMD 1400 may further include an eye tracking system 1414 for determining orientation and position of user's eyes in real time. The obtained position and orientation of the eyes also allows the HMD 1400 to determine the gaze direction of the user and to adjust the image generated by the display system 1480 accordingly. The determined gaze direction and vergence angle may be used to adjust the display system 1480 to reduce the vergence-accommodation conflict. The direction and vergence may also be used for displays' exit pupil steering as disclosed herein. Furthermore, the determined vergence and gaze angles may be used for interaction with the user, highlighting objects, bringing objects to the foreground, creating additional objects or pointers, etc. An audio system may also be provided including e.g. a set of small speakers built into the front body 1402.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A display device comprising:
a scanning projector for providing a collimated light beam;
a lightguide operably coupled to the scanning projector for conveying portions of the collimated light beam to an eyebox of the display device, the lightguide comprising a switchable in-coupling grating for in-coupling the collimated light beam into the lightguide by redirecting the collimated light beam in a first direction to propagate in the lightguide by a series of internal reflections; and
a controller that synchronizes switching of the in-coupling grating with an instantaneous scanning angle of the collimated light beam.

2. The display device of claim 1, wherein the switchable in-coupling grating comprises a non-switchable grating segment and a first switchable grating segment conterminous with the non-switchable grating segment and offset relative to the non-switchable grating segment in the first direction.

3. The display device of claim 2, wherein the switchable in-coupling grating further comprises a second switchable grating segment conterminous with the first switchable grating segment and offset relative to the first switchable grating segment in the first direction.

4. The display device of claim 1, wherein the switchable in-coupling grating comprises a plurality of conterminous switchable grating segments offset relative to one another in the first direction.

5. The display device of claim 1, wherein the switchable in-coupling grating has a switchable spatially variant diffraction efficiency.

6. The display device of claim 1, wherein:
the switchable in-coupling grating has a switchable spatially variant diffraction efficiency; and
in operation, the scanning projector scans the collimated light beam across the switchable in-coupling grating in the first direction from a first location to a second location on the switchable in-coupling grating, such that:
when at the first location, the collimated light beam propagates through the lightguide, reflects from its back surface, and impinges onto the switchable in-coupling grating from inside the lightguide at the second location, wherein a diffraction efficiency of the switchable in-coupling grating at the second location is lessened to lessen a diffraction of the collimated light beam at the second location while preserving the diffraction efficiency of the switchable in-coupling grating at the first location; and
when the collimated light beam impinges from outside of the lightguide onto the switchable in-coupling grating at the second location, the diffraction efficiency of the switchable in-coupling grating at the second location of the switchable in-coupling grating is increased to increase the diffraction of the collimated light beam at the second location.

7. The display device of claim 1, wherein the scanning projector comprises a tiltable reflector.

8. The display device of claim 1, wherein the scanning projector comprises a rastered microdisplay panel.

9. The display device of claim 1, wherein the switchable in-coupling grating comprises at least one of a switchable surface-relief liquid crystal (LC) grating or an active Pancharatnam-Berry phase (PBP) LC grating.

10. The display device of claim 1, wherein the switchable in-coupling grating comprises at least one of a polarization volume grating or a fluidic surface-relief grating.

11. A display device comprising:
a scanning projector for providing a collimated light beam;
a lightguide operably coupled to the scanning projector for receiving and propagating the collimated light beam therein, the lightguide comprising an out-coupling grating for out-coupling portions of the collimated light beam propagating in the lightguide to an eyebox of the display device, wherein the out-coupling grating is switchable between ON and OFF states; and
a controller operably coupled to the scanning projector and the out-coupling grating and configured to:
synchronize switching of an in-coupling grating of the lightguide with an instantaneous scanning angle of the collimated light beam;
during a first time interval, have the out-coupling grating in the ON state, and perform a scan of the collimated light beam from a first field of view (FOV) point to a second FOV point; and
during a second, subsequent time interval, cause the scanning projector to not emit the collimated light beam, and switch the out-coupling grating to the OFF state.

12. The display device of claim 11, wherein the out-coupling grating has a turn-on time interval from the OFF state to the ON state; and
wherein the controller is configured to turn the out-coupling grating ON at least the turn-on time interval before performing the scan of the collimated light beam from the first to the second FOV points.

13. The display device of claim 11, wherein the out-coupling grating is switchable in a spatially selective manner for providing a configurable distribution of the collimated light beam portions at the eyebox.

14. The display device of claim 11, wherein the scan is a linear raster scan.

15. The display device of claim 14, wherein the first time interval is equal to the second time interval to within +/−10%.

16. The display device of claim 11, wherein the scan is a Lissajous scan.

17. The display device of claim 16, wherein the out-coupling grating comprises at least one of: a switchable surface-relief liquid crystal (LC) grating; an active Pancharatnam-Berry phase (PBP) LC grating; a polarization volume grating; or a fluidic surface-relief grating.

18. The display device of claim 11, wherein the out-coupling grating is configured for switching of at least one of: grating efficiency, grating pitch, grating slant angle, or grating blazing angle.

19. A display device comprising:
a scanning projector for providing a collimated light beam; and
a lightguide comprising:
a switchable in-coupling grating operably coupled to the scanning projector for in-coupling the collimated light beam into the lightguide by redirecting the collimated light beam to propagate in the lightguide by a series of internal reflections; and a switchable out-coupling grating for out-coupling por-
tions of the collimated light beam propagating in the
lightguide to an eyebox of the display device; and
a controller that synchronizes switching of the in-coupling
grating with an instantaneous scanning angle of the
collimated light beam.

20. The display device of claim 19, wherein at least one
of the switchable in-coupling or out-coupling grating is
spatially variant.

\*    \*    \*    \*    \*